United States Patent
Li et al.

(10) Patent No.: US 10,674,503 B2
(45) Date of Patent: Jun. 2, 2020

(54) PUSCH TRANSMISSION METHOD AND APPARATUS

(71) Applicant: HUAWEI TECHNOLOGIES CO., LTD., Shenzhen (CN)

(72) Inventors: Zhongfeng Li, Shanghai (CN); Zhenfei Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1 day.

(21) Appl. No.: 15/388,195

(22) Filed: Dec. 22, 2016

(65) Prior Publication Data

US 2017/0105212 A1  Apr. 13, 2017

Related U.S. Application Data

(63) Continuation of application No. PCT/CN2014/080972, filed on Jun. 27, 2014.

(51) Int. Cl.
*H04W 72/04* (2009.01)
*H04W 28/02* (2009.01)
(Continued)

(52) U.S. Cl.
CPC .......... *H04W 72/0446* (2013.01); *H04L 5/00* (2013.01); *H04L 5/0053* (2013.01);
(Continued)

(58) Field of Classification Search
CPC ............. H04J 3/1694; H04W 72/0446; H04W 72/1289
(Continued)

(56) References Cited

U.S. PATENT DOCUMENTS

2012/0163319 A1* 6/2012 Roessel ................ H04L 1/0003
370/329
2012/0196643 A1* 8/2012 Xiao .................... H04W 52/30
455/522
(Continued)

FOREIGN PATENT DOCUMENTS

CN   103095419 A   5/2013
CN   103269258 A   8/2013
(Continued)

OTHER PUBLICATIONS

Chinese Office Action dated Feb. 7, 2018, in corresponding Chinese Patent Application No. 201480031486.3, 8 pgs.
(Continued)

*Primary Examiner* — Asad M Nawaz
*Assistant Examiner* — Jason A Harley
(74) *Attorney, Agent, or Firm* — Maier & Maier, PLLC

(57) ABSTRACT

Embodiments of the present invention disclose a PUSCH transmission method and apparatus. The method includes: sending, in a first subframe, downlink control signaling that instructs user equipment UE to transmit a physical uplink shared channel PUSCH, where the downlink control signaling carries downlink control information, and the downlink control information is used to indicate a subframe for transmitting the PUSCH, where the subframe for transmitting the PUSCH is any one of or any combination of N subframes, the N subframes include a special subframe, and N is an integer not less than 1; and receiving the PUSCH in the subframe indicated by the downlink control information. It can be seen that, in the embodiments of the present invention, a subframe in which a PUSCH is transmitted and that is indicated by downlink control information includes a special subframe; therefore, the special subframe can be scheduled to transmit the PUSCH.

12 Claims, 11 Drawing Sheets

(51) Int. Cl.
    *H04W 72/00*    (2009.01)
    *H04L 1/00*     (2006.01)
    *H04L 5/00*     (2006.01)
    *H04W 72/12*    (2009.01)
    *H04L 5/14*     (2006.01)

(52) U.S. Cl.
    CPC ......... *H04L 5/1469* (2013.01); *H04W 72/042* (2013.01); *H04W 72/12* (2013.01)

(58) Field of Classification Search
    USPC .......................................................... 370/329
    See application file for complete search history.

(56) References Cited

U.S. PATENT DOCUMENTS

| | | | |
|---|---|---|---|
| 2012/0207109 A1* | 8/2012 | Pajukoski | H04L 1/0029 370/329 |
| 2013/0039193 A1* | 2/2013 | Yin | H04W 72/0486 370/252 |
| 2013/0194980 A1 | 8/2013 | Yin et al. | |
| 2014/0071952 A1* | 3/2014 | Kim | H04L 5/001 370/335 |
| 2014/0092921 A1 | 4/2014 | Seo et al. | |
| 2015/0049654 A1 | 2/2015 | Pan et al. | |
| 2015/0085715 A1 | 3/2015 | Sun et al. | |
| 2015/0208406 A1 | 7/2015 | Seo et al. | |
| 2017/0105212 A1* | 4/2017 | Li | H04L 5/00 |

FOREIGN PATENT DOCUMENTS

| | | |
|---|---|---|
| CN | 103326840 A | 9/2013 |
| CN | 103327628 A | 9/2013 |
| CN | 103378961 A | 10/2013 |
| CN | 103503335 A | 1/2014 |
| CN | 103874217 A | 6/2014 |
| WO | 2013/024590 A1 | 2/2013 |
| WO | 2013/046561 A1 | 4/2013 |
| WO | 2013/111607 A1 | 8/2013 |
| WO | 2013/139208 A1 | 9/2013 |
| WO | 2013/141770 A1 | 9/2013 |
| WO | 2014/019213 A1 | 2/2014 |

OTHER PUBLICATIONS

Japanese Office Action dated Jan. 16, 2018 in corresponding Japanese Patent Application No. 2016-574368, 5 pgs.
International Search Report dated Feb. 27, 2015 in corresponding Application No. PCT/CN2014/080972.
International Search Report dated Feb. 27, 2015 in corresponding International Patent Application No. PCT/CN2014/080972.
Extended European Search Report dated Jun. 7, 2017 in corresponding European Patent Application No. 14895958.8.
Ruifeng et al., "Research on carrier aggregation-based PUSCH allocation", Study on Optical Communication, Apr. 2014, vol. 2, Sum No. 182, pp. 55-58, total 4 pages.

* cited by examiner

PUSCH TRANSMISSION METHOD AND APPARATUS

CROSS-REFERENCE TO RELATED APPLICATIONS

This application is a continuation of International Application No. PCT/CN2014/080972, filed on Jun. 27, 2014, the disclosure of which is hereby incorporated by reference in its entirety.

TECHNICAL FIELD

The present invention relates to the field of communications technologies, and more specifically, to a PUSCH transmission method and apparatus.

BACKGROUND

One LTE (Long Term Evolution) frame includes 10 subframes. The 10 subframes are classified into a downlink subframe, an uplink subframe, and a special subframe according to types.

In an existing LTE system, a special subframe is not invoked to perform PUSCH physical uplink shared channel) transmission. Therefore, existing PUSCH transmission, particularly, subframe scheduling, needs to be optimized.

SUMMARY

In view of this, an objective of embodiments of the present invention is to provide a PUSCH transmission method and apparatus, so as to invoke a special subframe to perform PUSCH transmission.

To achieve the foregoing objective, the following technical solutions are provided in the embodiments of the present invention:

According to a first aspect of the embodiments of the present invention, a PUSCH transmission method is provided, including:

sending, in a first subframe, downlink control signaling that instructs user equipment UE to transmit a physical uplink shared channel PUSCH, where the downlink control signaling carries downlink control information, and the downlink control information is used to indicate a subframe for transmitting the PUSCH, where the subframe for transmitting the PUSCH is any one of or any combination of N subframes, the N subframes include a special subframe, and N is an integer not less than 1; and receiving the PUSCH in the subframe indicated by the downlink control information.

With reference to the first aspect, in a first possible implementation manner, the subframe for transmitting the PUSCH is one of or a combination of the special subframe, the second subframe, and the third subframe, and is indicated by using three bits.

With reference to the first possible implementation manner of the first aspect, in a second possible implementation manner, the three bits include two bits of an uplink index.

With reference to the first possible implementation manner of the first aspect, in a third possible implementation manner, the three bits are all newly added bits.

With reference to the first aspect, in a fourth possible implementation manner, the subframe for transmitting the PUSCH is either of or a combination of the special subframe and the second subframe, and is indicated by using two bits.

With reference to the fourth possible implementation manner of the first aspect, in a fifth possible implementation manner, the two bits are two bits of an uplink index or two newly added bits.

With reference to any one of the first aspect to the fifth possible implementation manner of the first aspect, in a sixth possible implementation manner, when the subframe for transmitting the PUSCH is the special subframe, or is the special subframe and the second subframe, or is the special subframe and the third subframe, or is the special subframe, the second subframe, and the third subframe, and the PUSCH is transmitted in the special subframe that is used as an independent subframe, the method further includes: scaling up a physical resource block PRB quantity that is determined according to a TBS and an MCS and that corresponds to the special subframe; and indicating a scaled-up PRB quantity in the downlink control signaling.

With reference to any one of the first aspect to the fifth possible implementation manner of the first aspect, in a seventh possible implementation manner, when the special subframe indicated by the downlink control information, and a neighboring subframe form an enhanced subframe, the method further includes: scaling down a PRB quantity that is determined according to a TBS and an MCS and that corresponds to the enhanced subframe; and indicating a scaled-down PRB quantity in the downlink control signaling, where the neighboring subframe is an uplink subframe neighboring to the special subframe.

With reference to any one of the first aspect to the seventh possible implementation manner of the first aspect, in an eighth possible implementation manner, the first subframe is represented as a subframe n, where n is greater than or equal to 0 and less than 10, the special subframe is represented as a subframe n+k, the second subframe is represented as a subframe n+p, and the third subframe is represented as a subframe n+q, where k, p, and q are natural numbers.

With reference to the eighth possible implementation manner of the first aspect, in a ninth possible implementation manner, when an uplink-downlink subframe configuration is 0 and n is 1 or 6, k=5, p=6, and q=7.

With reference to the eighth possible implementation manner of the first aspect, in a tenth possible implementation manner, when an uplink-downlink subframe configuration is 0 and n is 0 or 5, k=6, p=4, and q=7.

With reference to the eighth possible implementation manner of the first aspect, in an eleventh possible implementation manner, when an uplink-downlink subframe configuration is 6 and n is 1 or 6, k=5 and p=7.

With reference to the eighth possible implementation manner of the first aspect, in a twelfth possible implementation manner, when an uplink-downlink subframe configuration is 6 and n is 0 or 5, k=6 and p=7.

With reference to the eighth possible implementation manner of the first aspect, in a thirteenth possible implementation manner, when an uplink-downlink subframe configuration is 0 and n is 0 or 5, k=6 and p=4.

With reference to the eighth possible implementation manner of the first aspect, in a fourteenth possible implementation manner, when an uplink-downlink subframe configuration is 0 and n is 1 or 6, k=5 and p=6.

According to a second aspect of the embodiments of the present invention, a PUSCH transmission method is provided, including:

receiving, in a first subframe, downlink control signaling that instructs to transmit a physical uplink shared channel PUSCH, where the downlink control signaling carries downlink control information, and the downlink control information is used to indicate a subframe for transmitting the PUSCH, where the subframe for transmitting the PUSCH is any one of or any combination of N subframes, the N subframes include a special subframe, and N is an integer not less than 1; and sending the PUSCH in the subframe indicated by the downlink control information.

With reference to the second aspect, in a first possible implementation manner of the second aspect, the subframe for transmitting the PUSCH is one of or a combination of the special subframe, the second subframe, and the third subframe, and is indicated by using three bits.

With reference to the second aspect, in a second possible implementation manner of the second aspect, the subframe for transmitting the PUSCH is either of or a combination of the special subframe and the second subframe, and is indicated by using two bits.

With reference to the second aspect, or the first possible implementation manner of the second aspect, or the second possible implementation manner of the second aspect, in a third possible implementation manner of the second aspect, when the subframe for transmitting the PUSCH is the special subframe, or is the special subframe and the second subframe, or is the special subframe and the third subframe, or is the special subframe, the second subframe, and the third subframe, and the PUSCH is transmitted in the special subframe that is used as an independent subframe, the method further includes: correspondingly scaling down a scaled-up physical resource block PRB quantity indicated in the downlink signaling; and determining a TBS by using a scaled-down PRB quantity, where the PUSCH is sent according to the determined TBS.

With reference to the second aspect, or the first possible implementation manner of the second aspect, or the second possible implementation manner of the second aspect, in a fourth possible implementation manner of the second aspect, when the special subframe indicated by the downlink control information, and a neighboring subframe form an enhanced subframe, the method further includes: correspondingly scaling up a scaled-down PRB quantity indicated in the downlink signaling; and determining a TBS by using a scaled-up PRB quantity, where the PUSCH is sent according to the determined TBS, and the neighboring subframe is an uplink subframe neighboring to the special subframe.

With reference to any one of the second aspect to the fourth possible implementation manner of the second aspect, in a fifth possible implementation manner of the second aspect, the first subframe is represented as a subframe n, where n is greater than or equal to 0 and less than 10, the special subframe is represented as a subframe n+k, the second subframe is represented as a subframe n+p, and the third subframe is represented as a subframe n+q, where k, p, and q are natural numbers.

With reference to the fifth possible implementation manner of the second aspect, in a sixth possible implementation manner of the second aspect, when an uplink-downlink subframe configuration is 0 and n is 1 or 6, k=5, p=6, and q=7.

With reference to the fifth possible implementation manner of the second aspect, in a seventh possible implementation manner of the second aspect, when an uplink-downlink subframe configuration is 0 and n is 0 or 5, k=6, p=4, and q=7.

With reference to the fifth possible implementation manner of the second aspect, in an eighth possible implementation manner of the second aspect, when an uplink-downlink subframe configuration is 6 and n is 1 or 6, k=5 and p=7.

With reference to the fifth possible implementation manner of the second aspect, in a ninth possible implementation manner of the second aspect, when an uplink-downlink subframe configuration is 6 and n is 0 or 5, k=6 and p=7.

With reference to the fifth possible implementation manner of the second aspect, in a tenth possible implementation manner of the second aspect, when an uplink-downlink subframe configuration is 0 and n is 0 or 5, k=6 and p=4.

With reference to the fifth possible implementation manner of the second aspect, in an eleventh possible implementation manner of the second aspect, when an uplink-downlink subframe configuration is 0 and n is 1 or 6, k=5 and p=6.

According to a third aspect of the embodiments of the present invention, a PUSCH transmission apparatus is provided, including:

a downlink control signaling sending unit, configured to send, in a first subframe, downlink control signaling that instructs user equipment UE to transmit a physical uplink shared channel PUSCH, where the downlink control signaling carries downlink control information, and the downlink control information is used to indicate a subframe for transmitting the PUSCH, where the subframe for transmitting the PUSCH is any one of or any combination of N subframes, the N subframes include a special subframe, and N is an integer not less than 1; and a PUSCH receiving unit, configured to receive the PUSCH in the subframe indicated by the downlink control information.

With reference to the third aspect, in a first possible implementation manner of the third aspect, the apparatus further includes:

a scale-up unit, configured to: when the subframe for transmitting the PUSCH is the special subframe, or is the special subframe and the second subframe, or is the special subframe and the third subframe, or is the special subframe, the second subframe, and the third subframe, and the PUSCH is transmitted in the special subframe that is used as an independent subframe, scale up a physical resource block PRB quantity that is determined according to a TBS and an MCS and that corresponds to the special subframe; and a first PRB quantity indication unit, configured to indicate a scaled-up PRB quantity in the downlink control signaling.

With reference to the third aspect, in a second possible implementation manner of the third aspect, the apparatus further includes: a scale-down unit, configured to: when the special subframe indicated by the downlink control information, and a neighboring subframe form an enhanced subframe, scale down a PRB quantity that is determined according to a TBS and an MCS and that corresponds to the enhanced subframe; and a second PRB quantity indication unit, configured to indicate a scaled-down PRB quantity in the downlink control signaling, where the neighboring subframe is an uplink subframe neighboring to the special subframe.

According to a fourth aspect of the embodiments of the present invention, a PUSCH transmission apparatus is provided, including:

a downlink control signaling receiving unit, configured to receive, in a first subframe, downlink control signaling that instructs to transmit a physical uplink shared channel PUSCH, where the downlink control signaling carries downlink control information, and the downlink control information is used to indicate a subframe for transmitting the PUSCH, where the subframe for transmitting the PUSCH is any one of or any combination of N subframes, the N subframes include a special subframe, and N is an integer not less than 1; and a PUSCH sending unit, configured to send the PUSCH in the subframe indicated by the downlink control information.

With reference to the fourth aspect, in a first possible implementation manner of the fourth aspect, the apparatus further includes: a down unit, configured to: when the subframe for transmitting the PUSCH is the special subframe, or is the special subframe and the second subframe, or is the special subframe and the third subframe, or is the special subframe, the second subframe, and the third subframe, and the PUSCH is transmitted in the special subframe that is used as an independent subframe, correspondingly scale down a scaled-up physical resource block PRB quantity indicated in the downlink signaling; and a first TBS determining unit, configured to determine a TBS by using a scaled-down PRB quantity, where the PUSCH is sent according to the determined TBS.

With reference to the fourth aspect, in a second possible implementation manner of the fourth aspect, the apparatus further includes: an up unit, configured to: when the special subframe indicated by the downlink control information, and a neighboring subframe form an enhanced subframe, correspondingly scale up a scaled-down PRB quantity indicated in the downlink signaling; and a second TBS determining unit, configured to determine a TBS by using a scaled-up PRB quantity, where the PUSCH is sent according to the determined TBS, and the neighboring subframe is an uplink subframe neighboring to the special subframe.

According to a fifth aspect of the embodiments of the present invention, a PUSCH transmission apparatus is provided, including at least a processor, a transceiver, and a memory, where the processor is configured to instruct, by running a software program stored in the memory and invoking data stored in the memory, the transceiver to perform the following steps:

sending, in a first subframe, downlink control signaling that instructs user equipment UE to transmit a physical uplink shared channel PUSCH, where the downlink control signaling carries downlink control information, and the downlink control information is used to indicate a subframe for transmitting the PUSCH, where the subframe for transmitting the PUSCH is any one of or any combination of N subframes, the N subframes include a special subframe, and N is an integer not less than 1; and receiving the PUSCH in the subframe indicated by the downlink control information.

With reference to the fifth aspect, in a first possible implementation manner of the fifth aspect, the processor is further configured to perform the following steps by running the software program stored in the memory and invoking the data stored in the memory: when the subframe for transmitting the PUSCH is the special subframe, or is the special subframe and the second subframe, or is the special subframe and the third subframe, or is the special subframe, the second subframe, and the third subframe, and the PUSCH is transmitted in the special subframe that is used as an independent subframe, scaling up a physical resource block PRB quantity that is determined according to a TBS and an MCS and that corresponds to the special subframe; and indicating a scaled-up PRB quantity in the downlink control signaling.

With reference to the fifth aspect, in a second possible implementation manner of the fifth aspect, the processor is further configured to perform the following steps by running the software program stored in the memory and invoking the data stored in the memory: when the special subframe indicated by the downlink control information, and a neighboring subframe form an enhanced subframe, scaling down a PRB quantity that is determined according to a TBS and an MCS and that corresponds to the enhanced subframe; and indicating a scaled-down PRB quantity in the downlink control signaling, where the neighboring subframe is an uplink subframe neighboring to the special subframe.

According to a sixth aspect of the embodiments of the present invention, a PUSCH transmission apparatus is provided, including at least a processor, a transceiver, and a memory, where the processor is configured to instruct, by running a software program stored in the memory and invoking data stored in the memory, the transceiver to perform the following steps:

receiving, in a first subframe, downlink control signaling that instructs to transmit a physical uplink shared channel PUSCH, where the downlink control signaling carries downlink control information, and the downlink control information is used to indicate a subframe for transmitting the PUSCH, where the subframe for transmitting the PUSCH is any one of or any combination of N subframes, the N subframes include a special subframe, and N is an integer not less than 1; and sending the PUSCH in the subframe indicated by the downlink control information.

With reference to the sixth aspect, in a first possible implementation manner of the sixth aspect, the processor is further configured to perform the following steps by running the software program stored in the memory and invoking the data stored in the memory: when the subframe for transmitting the PUSCH is the special subframe, or is the special subframe and the second subframe, or is the special subframe and the third subframe, or is the special subframe, the second subframe, and the third subframe, and the PUSCH is transmitted in the special subframe that is used as an independent subframe, correspondingly scaling down a scaled-up physical resource block PRB quantity indicated in the downlink signaling; and determining a TBS by using a scaled-down PRB quantity, where the PUSCH is sent according to the determined TBS.

With reference to the sixth aspect, in a second possible implementation manner of the sixth aspect, the processor is further configured to perform the following steps by running the software program stored in the memory and invoking the data stored in the memory: when the special subframe indicated by the downlink control information, and a neighboring subframe form an enhanced subframe, correspondingly scaling up a scaled-down PRB quantity indicated in the downlink signaling; and determining a TBS by using a scaled-up PRB quantity, where the PUSCH is sent according to the determined TBS, and the neighboring subframe is an uplink subframe neighboring to the special subframe.

It can be seen that, in the embodiments of the present invention, downlink control information in downlink control signaling may indicate a subframe in which a PUSCH is transmitted, and the subframe for transmitting the PUSCH further includes a special subframe; therefore, the special subframe can be scheduled to transmit the PUSCH.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
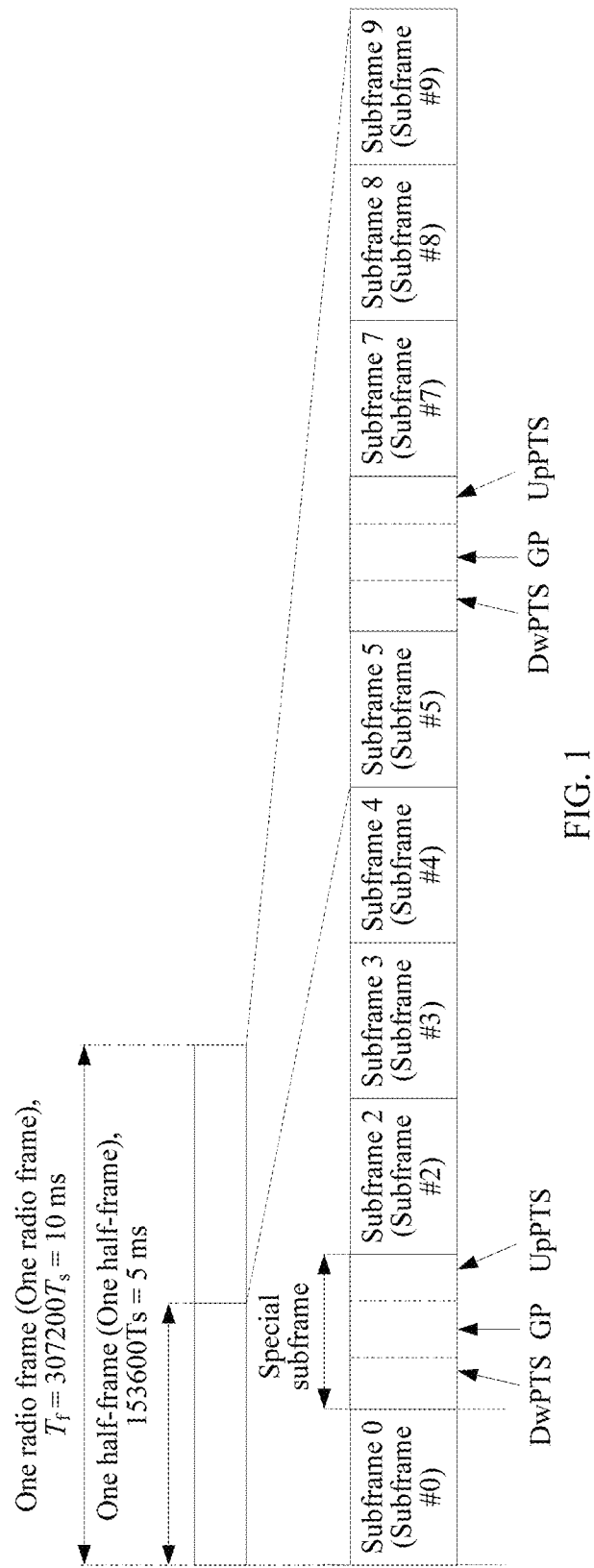
FIG. 1 is a schematic structural diagram of an LTE frame according to an embodiment of the present invention.

Referring to FIG. 1, a length of one LTE frame (that is, a radio frame) is 10 ms ($T_f$=307200$T_s$=10 ms), one LTE frame includes 10 subframes, and a length of each subframe is 1 ms. In FIG. 1, $T_f$ indicates a frame length, and $T_s$ indicates a minimum time unit.

A CP (cyclic prefix) in a subframe is classified into a common CP or an extended CP according to a length. For the common CP, one subframe includes 14 OFDM symbols, and for the extended CP, one subframe includes 12 OFDM symbols.

A subframe may be classified into a downlink subframe, an uplink subframe, or a special subframe according to a type of the subframe (the downlink subframe and the uplink subframe may be uniformly referred to as normal subframes).

One LTE frame includes one or two special subframes, which may be represented as a subframe 1 or a subframe 1 and a subframe 6 respectively. Each special subframe includes three parts: a DwPTS (downlink pilot time slot), a GP (guard period), and an UpPTS (uplink pilot time slot).

An OFDM symbol of the DwPTS part is used for downlink transmission, depends on a configured quantity of OFDM symbols, and may be used to transmit a control channel, a data channel, a synchronization signal, or a pilot signal; a time of the GP part is a guard period, and downlink or uplink transmission is not performed.

In an existing LTE system, an existing UpPTS has a maximum of two OFDM symbols, is used to send an uplink SRS (Sounding Reference Signal) or a PRACH (physical random access channel), and does not support PUSCH transmission. Therefore, in the existing LTE system, a special subframe is not invoked to perform PUSCH transmission.

In an LTE Rel-12 phase, a company proposes to increase a quantity of available OFDM symbols of an UpPTS, and enable an UpPTS in a special subframe to participate in PUSCH transmission, to enhance uplink coverage, but does not provides how to perform scheduling and transmission. Therefore, existing PUSCH transmission, and particularly, subframe scheduling need to be optimized.

An UpPTS whose quantity of OFDM symbols has been increased may be referred to as an UpPTS (an extended UpPTS for short) whose symbols have been extended or an enhanced UpPTS.

Considering that in a special subframe, a length of a DwPTS is at least three OFDM symbols, a length of a GP is at least one OFDM symbol, for a length of a common CP, a quantity of symbols that are included in an extended UpPTS may be greater than 2 and less than 10. For a length of an extended CP, a quantity of symbols that are included in an extended UpPTS may be greater than 2 and less than 8.

It should be noted that, an UpPTS mentioned in all embodiments of the present invention may be an extended UpPTS, or may be an UpPTS (that is, including a maximum of two OFDM symbols) whose symbols have not been extended.

An embodiment of the present invention provides a PUSCH transmission method, so as to invoke a special subframe to perform PUSCH transmission.

The PUSCH transmission method may be applied to (but not limited to) a wireless communications device such as a base station, a terminal, a WiFi AP (access point), a WiFi terminal, or a Relay station.

Figure 2:
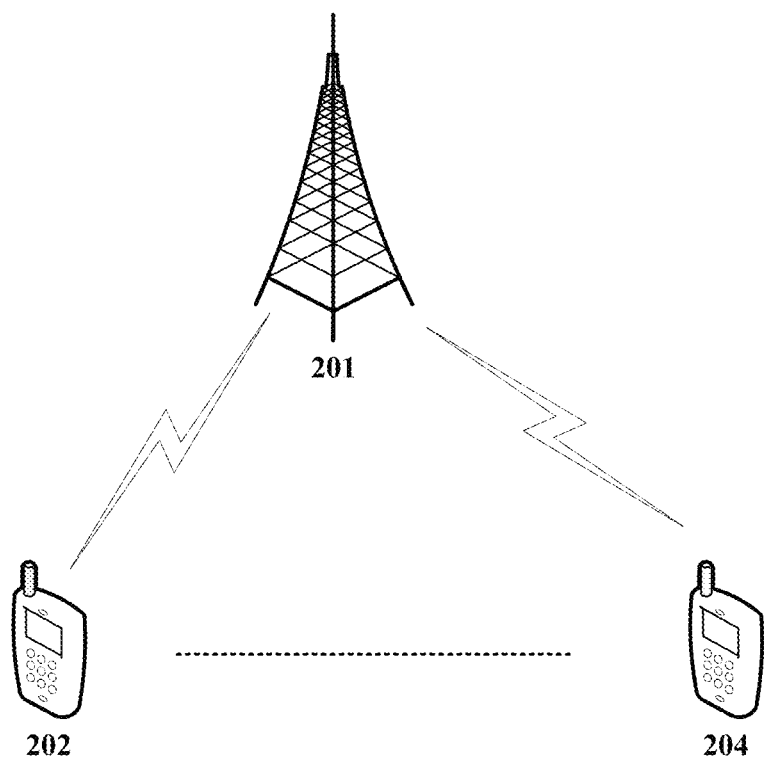
FIG. 2 is an exemplary diagram of an application scenario of a PUSCH transmission method according to an embodiment of the present invention.

FIG. 2 provides an application scenario of the foregoing PUSCH transmission method: being applied to communication between a base station 201 and any quantity of terminals that are similar to an access terminal 202 and an access terminal 204.

The access terminal 202 or 204 may be, for example, a cellular phone, a smartphone, a portable computer, a hand-held communications device, a hand-held computing device, a satellite radio apparatus, a global positioning system, a PDA, and/or any other appropriate device.

The base station 201 may include multiple antenna groups. Each antenna group may include one or more antennas. The base station 201 may additionally include a transmitter chain and a receiver chain, and a person of ordinary skill in the art may understand that both of them may include multiple components related to signal sending and receiving (for example, a processor, a modulator, a multiplexer, a demodulator, a demultiplexer, and an antenna).

At a given time, the base station 201, the access terminal 202, or the access terminal 204 may be a wireless communications sending apparatus and/or a wireless communications receiving apparatus. When sending a PUSCH, the wireless communications sending apparatus may perform a series of related processing (such as encoding, scrambling, modulation, layer mapping, precoding, and resource mapping) on data, for transmission. Specifically, the wireless communications sending apparatus may acquire (for example, generate, receive from another communications apparatus, store in a memory, or the like) a given quantity of data bits that need to be sent to the wireless communications receiving apparatus by using a channel. Such data bits may be included in a transport block (TB) of data.

Figure 3:
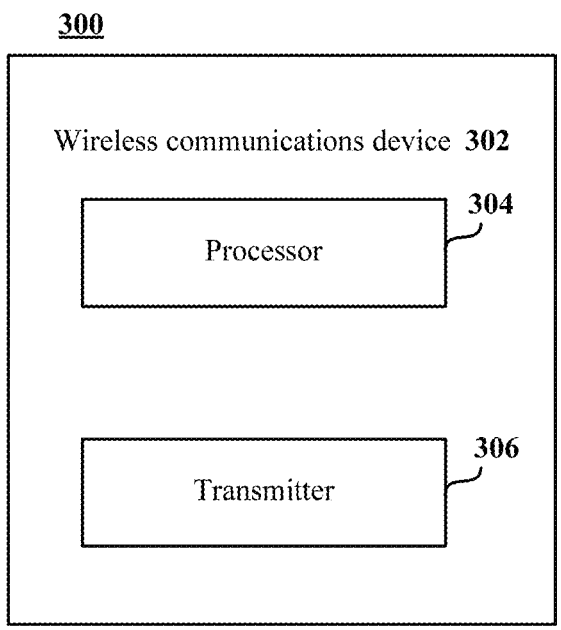
FIG. 3 is an exemplary diagram of a wireless system according to an embodiment of the present invention.

FIG. 3 is a schematic block diagram of a system 300 that is used in a PUSCH transmission method and that is applicable to the present invention in a wireless communications environment. The system 300 includes a wireless communications device 302, where the wireless communications device 302 may send data by using a channel. In addition, the wireless communications device 302 may further receive data by using a channel (for example, the wireless communications device 302 may simultaneously send and receive data, the wireless communications device 302 may send and receive data at different moments, the wireless communications device 302 may perform a combination thereof, or the like). The wireless communications device 302 may be a base station (for example, the base station 201 in FIG. 2), an access terminal (for example, the access terminal 204 in FIG. 2 or the access terminal 202 in FIG. 2), or the like.

The wireless communications device 302 may include a processor 304 and a transmitter 306. Optionally, when the wireless communications device 302 receives data by using a channel, the wireless communications device 302 may further include a receiver, where the receiver may exist independently, or may be integrated with the transmitter 306 to form a transceiver.

The processor 304 may be configured to instruct the transmitter 306 or the receiver to send or receive data, to implement PUSCH transmission.

The transmitter 306 may be configured to transmit data according to the instruction of the processor 304.

A specific processing process of PUSCH transmission is described below in detail.

Figure 4:
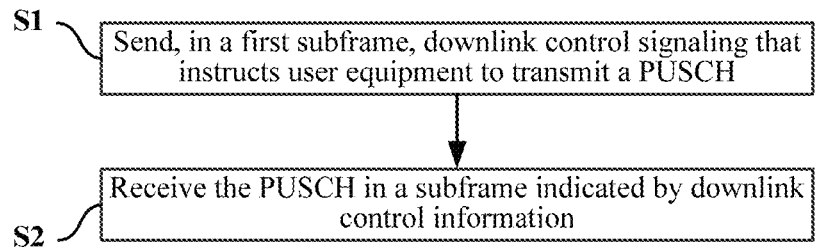
FIG. 4 is a flowchart of a PUSCH transmission method according to an embodiment of the present invention.

FIG. 4 is a schematic flowchart of a PUSCH transmission method according to an embodiment of the present invention. The method shown in FIG. 4 may be performed by the wireless communications device 302 such as a base station, and may include at least the following steps:

S1: Send, in a first subframe, downlink control signaling that instructs user equipment (UE) to transmit a PUSCH.

A function of transmitting a PUSCH may refer to transmitting uplink data by using the PUSCH, or refer to carrying uplink data on the PUSCH.

The first subframe may be represented as a subframe n (n is greater than or equal to 0 and less than 10).

The downlink control signaling carries downlink control information (DCI), and the downlink control information is used to indicate a subframe for transmitting the PUSCH.

More specifically, the base station may schedule PUSCH transmission by using DCI carried on a PDCCH (physical downlink control channel)/an EPDCCH (enhanced physical downlink control channel).

The DCI may be an existing DCI format 0 or DCI format 4 (the DCI format 0 or 4 is used for uplink scheduling) or a newly defined DCI for uplink scheduling.

In this specification, how to indicate a subframe in which a PUSCH is transmitted is described in detail subsequently.

S2: Receive the PUSCH in a subframe indicated by the downlink control information.

The subframe for transmitting the PUSCH may be any one of or any combination of N subframes (N is an integer not less than 1), and the N subframes include a special subframe.

Figure 5:
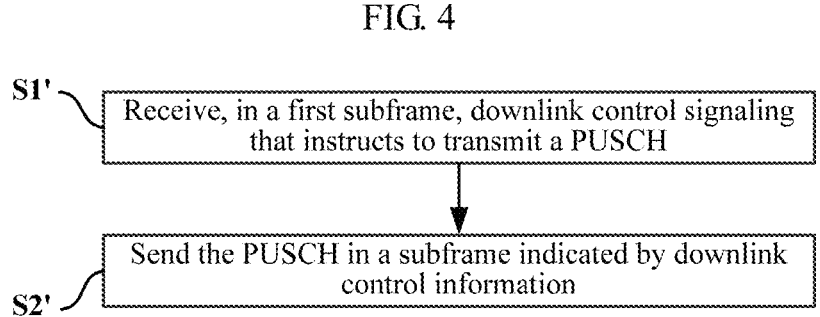
FIG. 5 is another flowchart of a PUSCH transmission method according to an embodiment of the present invention.

Correspondingly, FIG. 5 is another schematic flowchart of a PUSCH transmission method according to an embodiment of the present invention. The method shown in FIG. 5 may be performed by the wireless communications device 302 such as an access terminal, and may include at least the following steps:

S1': Receive, in a first subframe, downlink control signaling that instructs to transmit a PUSCH.

The first subframe may be represented as a subframe n (n is greater than or equal to 0 and less than 10). The downlink control signaling may be sent by a base station, a WiFi AP, a Relay station, or the like.

The downlink control signaling carries downlink control information, and the downlink control information is used to indicate a subframe for transmitting the PUSCH.

S2': Send the PUSCH in a subframe indicated by the downlink control information.

The subframe for transmitting the PUSCH may be any one of or any combination of N subframes (N is an integer not less than 1), and the N subframes include a special subframe.

It can be seen that, in this embodiment of the present invention, downlink control information in downlink control signaling may indicate a subframe in which a PUSCH is transmitted, and the subframe for transmitting the PUSCH further includes a special subframe; therefore, the special subframe can be scheduled to transmit the PUSCH.

A time division multiplexing manner is used in uplink and downlink transmission of an LTE TDD (time division multiplexing) system, and different uplink-downlink subframe configurations help to be applied in scenarios with different uplink-downlink service requirements.

In LTE TDD, seven uplink-downlink subframe configurations are defined, as shown in the following Table 1. In Table 1, D indicates a downlink subframe, S indicates a special subframe, and U indicates an uplink subframe.

TABLE 1

| Uplink-downlink configuration | Period of a switchover point from downlink to uplink | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

PUSCH transmission is uplink transmission. Before PUSCH transmission is performed, a base station needs to send, in a downlink subframe, DCI to schedule an uplink subframe or some uplink subframes to perform PUSCH transmission.

It can be seen from Table 1 that, in the uplink-downlink subframe configurations 1 to 5, even if an UpPTS in a special subframe is enabled to participate in uplink transmission, a quantity of subframes (a DwPTS in the special subframe can also be used for downlink transmission) that can be used for downlink transmission is greater than a quantity of subframes that can be used for uplink transmission. Therefore, one uplink subframe can be implemented scheduled in one downlink subframe. Therefore, in the uplink-downlink subframe configurations 1 to 5, the downlink control information carried in the downlink control signaling sent in the first subframe may only indicate that the special subframe is used for PUSCH transmission.

However, in the uplink-downlink subframe configurations 0 and 6, it is opposite. A quantity of subframes that can be used for downlink transmission is less than or equal to a quantity of subframes that can be used for uplink transmission. If an UpPTS in the special subframe is further enabled to participate in uplink transmission, one uplink subframe cannot be scheduled in one downlink subframe.

Therefore, it may be designed in such a manner that a maximum of two, three, or even more subframes are scheduled in the first subframe (the subframe n), to perform PUSCH transmission. Certainly, a maximum of two, three, or even more subframes that are scheduled include a special subframe.

Further, when a maximum of three subframes can be scheduled in the first subframe (the subframe n) to perform PUSCH transmission, the subframe (that is, the subframe indicated by the downlink control information) in which the PUSCH is transmitted may be any one of or any combination of the special subframe, a second subframe, and a third subframe.

When a maximum of two subframes can be scheduled in the first subframe (the subframe n) to perform PUSCH transmission, the subframe (that is, the subframe indicated by the downlink control information) in which the PUSCH is transmitted may be either of or any combination of the special subframe and the second subframe.

For simplicity, the special subframe may be represented as a subframe n+k, the second subframe may be represented as a subframe n+p, and the third subframe may be represented as a subframe n+q, where k, p, and q are natural numbers.

In another embodiment of the present invention, the downlink control information may indicate one of or a combination of the subframe n+k, the subframe n+p, and the subframe n+q by using three bits; or the downlink control information may indicate one of or a combination of the subframe n+k and the subframe n+p by using two bits.

Further, the three bits may include two bits of an uplink index (a UL index), and the remaining one bit may be a newly added bit; or a bit in the downlink control signaling is reused as the remaining one bit; or a reserved bit in the downlink control signaling is used as the remaining one bit; or all of the three bits may be newly added bits.

In a case in which the downlink control information indicates one of or a combination of the subframe n+k and the subframe n+p by using two bits, the two bits may be two bits of the uplink index or two newly added bits.

How to indicate a subframe in which a PUSCH is transmitted is separately described below for the uplink-downlink subframe configuration 0 and the uplink-downlink subframe configuration 6.

For the uplink-downlink subframe configuration 0:

In the prior art, for each subframe of subframes 0, 1, 5, and 6, a case of PUSCH transmission in which DCI carried in a transmitted PDCCH or EPDCCH schedule two uplink subframes may occur. A specific rule is:

UE receives, in a subframe n, a DCI format 0 or 4, where an uplink index in the DCI format 0 or 4 includes two bits. When an LSB (least significant bit) of the two bits is set to 1, the UE sends a PUSCH in a subframe n+7. However, when an MSB (most significant bit) of the two bits is set to 1, the UE sends a PUSCH in a subframe n+S; when both the MSB and the LSB of the two bits are set to 1, the UE sends PUSCHs in the subframe n+7 and the subframe n+S.

A value of S is shown in Table 2: when n=0, S=4; when n=1, S=6; when n=5, S=4; or when n=6, S=6.

TABLE 2

| Subframe number n | | | | | | | | | | |
|---|---|---|---|---|---|---|---|---|---|---|
| 0 | 1 | 2 | 3 | 4 | 5 | 6 | 7 | 8 | 9 |
| 4 | 6 | | | | 4 | 6 | | | |

Scenario 1: A PUSCH is scheduled on a PDCCH/an EPDCCH that is transmitted in a subframe 1 or 6.

Unless otherwise stated, that the PDCCH/EPDCCH is transmitted in the subframe 1 or 6, which is described in the present invention, may specifically refer to that the PDCCH/EPDCCH is transmitted in a DwPTS in the subframe 1 or 6.

Method 1 in the scenario 1: Bits are not additionally added, the meaning of bits of a UL index is redefined.

In an existing manner, when the uplink-downlink subframe configuration is 0, PUSCHs transmitted in subframes 2 and 7 may be separately scheduled by subframes 6 and 1, or may be separately scheduled by subframes 5 and 0; PUSCHs transmitted in subframes 3 and 8 are separately scheduled by the subframes 6 and 1.

In this method, the PUSCHs transmitted in the subframes 2 and 7 may be limited to being separately scheduled by the subframes 5 and 0, so that a value of a UL index in downlink control information transmitted in a DwPTS in the subframes 1 and 6 may be redefined to schedule the PUSCHs transmitted in (an UpPTS in) the subframes 6 and 1.

Unless otherwise stated, that the PUSCH is transmitted in the subframe 6 or 1, which is described in the present invention, may specifically refer to that the PUSCH is transmitted in an UpPTS in the subframe 6 or 1.

A specific manner is as follows:

Case 1: When UE receives a DCI format 0/4 in a subframe n (n=1 or 6), if an LSB in a UL index in DCI is set to 1, the UE sends a PUSCH in a subframe n+k.

In this embodiment, k may be equal to 5. Because n=1 or 6, when n=1, n+k=6, or when n=6, n+k=11. The subframe 6 is a special subframe, and a subframe 11 is a subframe 1 in a next LTE frame, and is also a special subframe. Therefore, an UpPTS in the special subframe can be scheduled.

Case 2: When UE receives a DCI format 0/4 in a subframe n (n=1 or 6), if an MSB in a UL index is set to 1, the UE sends a PUSCH in a subframe n+p.

In this embodiment, p may be equal to 6. Because n=1 or 6, when n=1, n+p=7, or when n=6, n+p=12 (a subframe 2 in a next LTE frame).

Alternatively, it may be opposite that, if an LSB in a UL index in DCI is set to 1, UE sends a PUSCH in a subframe n+p; if an MSB in a UL index is set to 1, UE sends a PUSCH in a subframe n+k.

Case 3: When UE receives a DCI format 0/4 in a subframe n, if both an LSB and an MSB in a UL index are set to 1, the UE sends PUSCHs in subframes n+k and n+p (k=5, and p=6).

Method 2 in the scenario 1: Two bits are additionally added. That is, two bits are newly added in DCI or downlink control signaling.

A specific manner is as follows:

Case 1: When UE receives a DCI format 0/4 in a subframe n (n=1 or 6), if an LSB in two newly added bits is set to 1, the UE sends a PUSCH in a subframe n+k.

In this embodiment, k may be equal to 5. Because n=1 or 6, when n=1, n+k=6, or when n=6, n+k=11. The subframe 6 is a special subframe, and a subframe 11 is a subframe 1 in a next LTE frame, and is also a special subframe. Therefore, an UpPTS in the special subframe can be scheduled.

Case 2: When UE receives a DCI format 0/4 in a subframe n (n=1 or 6), if an MSB in two newly added bits is set to 1, the UE sends a PUSCH in a subframe n+p.

In this embodiment, p may be equal to 6. Because n=1 or 6, when n=1, n+p=7, or when n=6, n+p=12 (a subframe 2 in a next LTE frame).

Alternatively, it may be opposite that, if an LSB in two newly added bits is set to 1, UE sends a PUSCH in a subframe n+p; if an MSB in two newly added bits is set to 1, UE sends a PUSCH in a subframe n+k.

Case 3: When UE receives a DCI format 0/4 in a subframe n, if both an LSB and an MSB in two newly added bits are set to 1, the UE sends PUSCHs in subframes n+k and n+p (k=5, and p=6).

Method 3 in the scenario 1: Indication is performed by using a newly added bit and an existing bit in a UL index. The newly added bit may be an existing bit in a DCI format 0/4, or may be a bit that is additionally added. Because a bit is newly added, scheduling a maximum of three subframes can be supported.

Case 1: A newly added bit is set to 0 (a PUSCH is not transmitted in a subframe 6 or 1).

When UE receives a DCI format 0/4 in a subframe n (n=1 or 6), if an LSB in a UL index is set to 1, the UE sends a PUSCH in a subframe n+q.

In this embodiment, q may be equal to 7. Because n=1 or 6, when n=1, n+q=8, or when n=6, n+q=13 (a subframe 3 in a next LTE frame).

If an MSB in a UL index is set to 1, the UE sends a PUSCH in a subframe n+p, where p may be equal to 6.

Alternatively, it may be opposite that, if an LSB in a UL index in DCI is set to 1, UE sends a PUSCH in a subframe n+p; if an MSB in a UL index is set to 1, UE sends a PUSCH in a subframe n+q.

If both an LSB and an MSB in a UL index are set to 1, UE sends PUSCHs in subframes n+q and n+p.

Case 2: A newly added bit is set to 1.

When UE receives a DCI format 0/4 in a subframe n (n=1 or 6), if an LSB in a UL index is set to 1, the UE sends PUSCHs in subframes n+k and n+q, where k=5 and q=7.

If an MSB in a UL index is set to 1, UE sends PUSCHs in subframes n+k and n+p, where p may be equal to 6.

Alternatively, it may be opposite that, if an LSB in a UL index in DCI is set to 1, UE sends PUSCHs in subframes n+k and n+p; if an MSB in a UL index is set to 1, UE sends PUSCHs in subframes n+k and n+q.

If both an LSB and an MSB in a UL index are set to 1, UE sends PUSCHs in subframes n+k, n+q, and n+p.

If both an LSB and an MSB in a UL index are set to 0, UE sends a PUSCH in only a subframe n+k (k=5).

Case 3: Three bits are newly defined.

It is assumed that, the newly defined three bits are represented as b2, b1, and b0, and different values of the newly defined three bits may correspond to eight different combinations. Seven combinations may be selected from the eight different combinations to indicate a subframe in which a PUSCH is transmitted.

For example, when a value of b2, b1, and b0 is 001, a subframe in which a PUSCH is transmitted is a subframe n+q;

when a value of b2, b1, and b0 is 010, a subframe in which a PUSCH is transmitted is a subframe n+p;

when a value of b2, b1, and b0 is 011, subframes in which PUSCHs are transmitted are subframes n+p and n+q;

when a value of b2, b1, and b0 is 100, a subframe in which a PUSCH is transmitted is a subframe n+k;

when a value of b2, b1, and b0 is 101, subframes in which PUSCHs are transmitted are subframes n+k and n+q;

when a value of b2, b1, and b0 is 110, subframes in which PUSCHs are transmitted are subframes n+k and n+p; or when a value of b2, b1, and b0 is 111, subframes in which PUSCHs are transmitted are subframes n+k, n+p, and n+q.

In the case 3, q=7, p=6, and k=5.

The methods in the scenario 1 may be used for HARQ (Hybrid Automatic Repeat Request, hybrid automatic repeat request) transmission.

An example in which an UpPTS in a special subframe is invoked to perform HARQ transmission is used. An RTT corresponding to a HARQ process in which a PUSCH is transmitted in the UpPTS may be 10 ms or 15 ms. The following time relationships may be obtained according to that a time interval from a PDCCH/an EPDCCH to the scheduled PUSCH is minimized, a requirement of a processing time of at least 3 ms is also met, and the PDCCH/EPDCCH or the PHICH (physical HARQ indicator channel) needs to be transmitted in a DwPTS in a downlink subframe or a special subframe:

a time from the PDCCH/EPDCCH to scheduling PUSCH transmission: UE receives, in a subframe n, uplink DCI carried in the PDCCH/EPDCCH, and sends a PUSCH in a subframe n+5 (this is retransmission scheduling), where n is 1 or 6; and a time from the PHICH to triggering PUSCH transmission: UE receives a PHICH in a subframe n, where the PHICH is a feedback (an NACK signal is fed back) of a PUSCH that is transmitted in a subframe 1 or 6 before the subframe n, and sends a PUSCH in a subframe n+5 (this is retransmission scheduling), where n is 1 or 6.

Scenario 2: A PUSCH is scheduled on a PDCCH/an EPDCCH that is transmitted in a subframe 0 or 5.

In this method, PUSCHs transmitted in subframes 2 and 7 may be limited to being separately scheduled by subframes 6 and 1, so that a value of a UL index in downlink control information transmitted in the subframes 0 and 5 may be redefined to schedule PUSCHs transmitted in the subframes 1 and 6.

A specific manner is as follows:

Case 1: When UE receives a DCI format 0/4 in a subframe n (n=0 or 5), if an LSB in a UL index in DCI is set to 1, the UE sends a PUSCH in a subframe n+k.

In this embodiment, k may be equal to 6. Because n=0 or 5, when n=0, n+k=6, or when n=5, n+k=11. The subframe 6 is a special subframe, and a subframe 11 is a subframe 1 in a next LTE frame, and is also a special subframe. Therefore, an UpPTS in the special subframe can be scheduled.

Case 2: When UE receives a DCI format 0/4 in a subframe n (n=0 or 5), if an MSB in a UL index is set to 1, the UE sends a PUSCH in a subframe n+p.

In this embodiment, p may be equal to 4. Because n=0 or 5, when n=0, n+p=4, or when n=5, n+p=9.

Alternatively, it may be opposite that, if an LSB in a UL index in DCI is set to 1, UE sends a PUSCH in a subframe n+p; if an MSB in a UL index is set to 1, UE sends a PUSCH in a subframe n+k.

Case 3: When UE receives, a DCI format 0/4 in a subframe n, if both an LSB and an MSB in a UL index are set to 1, the UE sends PUSCHs in subframes n+k and n+p.

Method 2 in the scenario 2: Indication is performed by using a newly added bit and an existing bit in a UL index. The newly added bit may be an existing bit in a DCI format 0/4, or may be a bit that is additionally added. Because a bit is newly added, scheduling a maximum of three subframes can be supported.

Case 1: A newly added bit is set to 0 (a PUSCH is not transmitted in a subframe 6 or 1).

When UE receives a DCI format 0/4 in a subframe n (n=0 or 5), if an LSB in a UL index is set to 1, the UE sends a PUSCH in a subframe n+q.

In this embodiment, q may be equal to 7. Because n=0 or 5, when n=0, n+q=7, or when n=5, n+q=12 (a subframe 2 in a next LTE frame).

If an MSB in a UL index is set to 1, UE sends a PUSCH in a subframe n+p, where p may be equal to 4.

Alternatively, it may be opposite that, if an LSB in a UL index in DCI is set to 1, UE sends a PUSCH in a subframe n+p; if an MSB in a UL index is set to 1, UE sends a PUSCH in a subframe n+q.

If both an LSB and an MSB in a UL index are set to 1, UE sends PUSCHs in subframes n+q and n+p.

Case 2: A newly added bit is set to 1.

When UE receives a DCI format 0/4 in a subframe n (n=0 or 5), if an LSB in a UL index is set to 1, the UE sends PUSCHs in subframes n+k and n+q, where k=6 and q=7.

If an MSB in a UL index is set to 1, UE sends PUSCHs in subframes n+k and n+p, where p may be equal to 4.

Alternatively, it may be opposite that, if an LSB in a UL index in DCI is set to 1, UE sends PUSCHs in subframes n+k and n+p; if an MSB in a UL index is set to 1, UE sends PUSCHs in subframes n+k and n+q.

If both an LSB and an MSB in a UL index are set to 1, UE sends PUSCHs in subframes n+k, n+q, and n+p.

If both an LSB and an MSB in a UL index are set to 0, UE sends a PUSCH only in a subframe n+k (k=6).

Case 3: Three bits are newly defined.

It is assumed that, the newly defined three bits are represented as b2, b1, and b0, and different values of the newly defined three bits may correspond to eight different combinations. Seven combinations may be selected from the eight different combinations to indicate a subframe in which a PUSCH is transmitted.

For example, when a value of b2, b1, and b0 is 001, a subframe in which a PUSCH is transmitted is a subframe n+q;

when a value of b2, b1, and b0 is 010, a subframe in which a PUSCH is transmitted is a subframe n+p;

when a value of b2, b1, and b0 is 011, subframes in which PUSCHs are transmitted are subframes n+p and n+q;

when a value of b2, b1, and b0 is 100, a subframe in which a PUSCH is transmitted is a subframe n+k;

when a value of b2, b1, and b0 is 101, subframes in which PUSCHs are transmitted are subframes n+k and n+q;

when a value of b2, b1, and b0 is 110, subframes in which PUSCHs are transmitted are subframes n+k and n+p; or when a value of b2, b1, and b0 is 111, subframes in which PUSCHs are transmitted are subframes n+k, n+p, and n+q.

In the case 3, q=7, p=4, and k=6.

The methods in the scenario 2 may be used for HARQ transmission.

An example in which an UpPTS in a special subframe is invoked to perform HARQ transmission is used. An RTT corresponding to a HARQ process in which a PUSCH is transmitted in the UpPTS may be 10 ms or 15 ms. The following time relationships may be obtained according to that a time interval from a PDCCH/an EPDCCH to the scheduled PUSCH is minimized, a requirement of a processing time of at least 3 ms is also met, and the PDCCH/EPDCCH or the PHICH (physical HARQ indicator channel) needs to be transmitted in a DwPTS in a downlink subframe or a special subframe:

a time from the PDCCH/EPDCCH to scheduling PUSCH transmission: UE receives, in a subframe n, uplink DCI carried in the PDCCH/EPDCCH, and sends a PUSCH in a subframe n+6 (this is retransmission scheduling), where n is 0 or 5; and a time from the PHICH to triggering PUSCH transmission: UE receives a PHICH in a subframe n, where the PHICH is a feedback (an NACK signal is fed back) of a PUSCH that is transmitted in a subframe 1 or 6 before the subframe n, and sends a PUSCH in a subframe n+6 (this is retransmission scheduling), where n is 0 or 5.

For the uplink-downlink subframe configuration 6:

Scenario 1: A PUSCH is scheduled on a PDCCH/an EPDCCH that is transmitted in a subframe 1 or 6.

In the existing uplink-downlink subframe configuration 6, one downlink subframe can schedule only one uplink subframe. Therefore, when the uplink-downlink subframe configuration is 6, there is no UL index in DCI carried in the PDCCH/EPDCCH.

Therefore, a UL index may be introduced to the DCI carried in the PDCCH/EPDCCH, where the UL index includes two bits, which correspond to the following meaning:

Case 1: When UE receives a UL DCI format such as 0/4 in a subframe n (n=1 or 6), if an LSB in a UL index is set to 1, the UE sends a PUSCH in a subframe n+k (k=5).

Case 2: When UE receives a UL DCI format such as 0/4 in a subframe n (n=1 or 6), if an MSB in a UL index is set to 1, the UE sends a PUSCH in a subframe n+p (p=7).

Alternatively, it may be opposite that, if an LSB in a UL index in DCI is set to 1, UE sends a PUSCH in a subframe n+p; if an MSB in a UL index is set to 1, UE sends a PUSCH in a subframe n+k.

Case 3: When UE receives a DCI format 0/4 in a subframe n, if both an LSB and an MSB in a UL index are set to 1, the UE sends PUSCHs in subframes n+k and n+p (k=5, p=7).

The solutions in the scenario 1 may be used for HARQ transmission.

An example in which an UpPTS in a special subframe is invoked to perform HARQ transmission is used. An RTT corresponding to a HARQ process in which a PUSCH is transmitted in the UpPTS may be 10 ms or 15 mm. The following time relationships may be obtained according to that a time interval from a PDCCH/an EPDCCH to the scheduled PUSCH is minimized, a requirement of a processing time of at least 3 ms is also met, and the PDCCH/EPDCCH or the PHICH (physical HARQ indicator channel) needs to be transmitted in a DwPTS in a downlink subframe or a special subframe:

a time from the PDCCH/EPDCCH to scheduling PUSCH transmission: UE receives, in a subframe n, uplink DCI carried in the PDCCH/EPDCCH, and sends a PUSCH in a subframe n+5 (this is retransmission scheduling), where n is 1 or 6.

Scenario 2: A PUSCH is scheduled on a PDCCH/an EPDCCH that is transmitted in a subframe 0 or 5.

A UL index is still introduced to DCI carried in the PDCCH/EPDCCH, where the UL index includes two bits, which correspond to the following meaning:

Case 1: When UE receives a UL DCI format such as 0/4 in a subframe n (n=0 or 5), if an LSB in a UL index is set to 1, the UE sends a PUSCH in a subframe n+k (k=6).

Case 2: When UE receives a UL DCI format such as 0/4 in a subframe n (n=0 or 5), if an MSB in a UL index is set to 1, the UE sends a PUSCH in a subframe n+p (p=7).

Alternatively, it may be opposite that, if an LSB in a UL index in DCI is set to 1, UE sends a PUSCH in a subframe n+p; if an MSB in a UL index is set to 1, UE sends a PUSCH in a subframe n+k.

Case 3: When UE receives a DCI format 0/4 in a subframe n, if both an LSB and an MSB in a UL index are set to 1, the UE sends PUSCHs in subframes n+k and n+p (k=6, and p=7).

The solutions in the scenario 2 may be used for HARQ transmission.

An example in which an UpPTS in a special subframe is invoked to perform HARQ transmission is used. An RTT corresponding to a HARQ process in which a PUSCH is transmitted in the UpPTS may be 10 ms or 15 ms. The following time relationships may be obtained according to that a time interval from a PDCCH/an EPDCCH to the scheduled PUSCH is minimized, a requirement of a processing time of at least 3 ms is also met, and the PDCCH/EPDCCH or the PHICH (physical HARQ indicator channel) needs to be transmitted in a DwPTS in a downlink subframe or a special subframe:

a time from the PDCCH/EPDCCH to scheduling PUSCH transmission: UE receives, in a subframe n, uplink DCI carried in the PDCCH/EPDCCH, and sends a PUSCH in a subframe n+6 (this is retransmission scheduling), where n is 0 or 5; and a time from the PHICH to triggering PUSCH transmission: UE receives a PHICH in a subframe n, where the PHICH is a feedback (an NACK signal is fed back) of a PUSCH that is transmitted in a subframe 1 or 6 before the subframe n, and sends a PUSCH in a subframe n+6 (this is retransmission scheduling), where n is 0 or 5.

The PUSCH is used to transmit a TB (transport block).

In an existing manner, in DCI (in a format such as 0/4) that is sent by a base station or the like to UE, a quantity of VRBs (virtual resource block) of an invoked subframe, and an MCS (modulation and coding scheme) are further indicated. It should be noted that, there is a one-to-one correspondence between a VRB indicated in the DCI and a PRB (physical resource block), and there is also a one-to-one correspondence between a VRB quantity and a PRB quantity. Therefore, it can be considered that, the PRB quantity is indicated in the DCI.

After receiving the DCI, the UE determines a TBS (transport block size) of a transport block according to the PRB quantity indicated by the DCI with reference to the MCS indicated by the DCI. The TBS and the corresponding PRB quantity form an encoding rate indicated by the corresponding MCS.

In all the embodiments of the present invention, an UpPTS in a special subframe may participate in PUSCH transmission in at least two manners. One manner is that a PUSCH is transmitted independently in the UpPTS; in other words, regardless of whether a subframe in which the PUSH is transmitted and that is indicated by DCI includes only a special subframe, or includes both a special subframe and a second subframe, or includes both a third subframe and a special subframe, or includes all of a special subframe, a second subframe, and a third subframe, the special subframe is used as an independent subframe to transmit the PUSCH.

Another manner is that, a special subframe and a neighboring subframe form an enhanced subframe, where the neighboring subframe is an uplink subframe neighboring to the special subframe, that is, the neighboring subframe may be a subframe 2 or a subframe 7. More specifically, a subframe 1 (a special subframe) and the subframe 2 may form an enhanced subframe, and a subframe 6 (a special subframe) and the subframe 7 may form an enhanced subframe.

A special subframe and a neighboring subframe form an enhanced subframe, which is equivalent to that an UpPTS in a special subframe, and a neighboring subframe form an enhanced subframe.

It should be noted that, the foregoing records that, when an uplink-downlink subframe configuration is 0 and n is 1 or 6, DCI may invoke subframes n+5 (a special subframe), n+6, and n+7. However, in a case in which the special subframe and a neighboring subframe form an enhanced subframe, even if a subframe in which a PUSH is transmitted and that is indicated by the DCI is the subframes n+5 and n+7 or is only the subframe n+5, on both a UE side and a base station side, the subframe n+5 and the subframe n+6 form an enhanced subframe to transmit a PUSCH by default.

Similarly, the foregoing further records that, when an uplink-downlink subframe configuration is 0 and n is 0 or 5, DCI may invoke subframes n+6 (a special subframe), n+7, and n+4. However, in a case in which the special subframe and a neighboring subframe form an enhanced subframe, even if a subframe in which a PUSH is transmitted and that is indicated by the DCI is the subframes n+6 and n+4 or is only the subframe n+6, on both a UE side and a base station side, the subframe n+6 and the subframe n+7 form an enhanced subframe to transmit a PUSCH by default.

It can be seen that, in a case in which a special subframe and a neighboring subframe form an enhanced subframe, a maximum of three subframes can be invoked by using two bits.

An UpPTS in the prior art has only two OFDM symbols to transmit an SRS or a PRACH, which has been described above. To transmit a PUSCH in the UpPTS and implement appropriate uplink capacity enhancement or coverage enhancement, extending an available OFDM symbol of the UpPTS may be considered.

In addition, currently, a DwPTS in a special subframe has a minimum of three OFDM symbols, and six OFDM symbols, and a GP needs at least one to two OFDM symbols. Therefore, in a case in which a total quantity of OFDM symbols of the special subframe is not extended, a quantity of OFDM symbols of the UpPTS may be extended to 5, 6, 7, 8, 9, or 10. However, from a perspective of considering coexistence with a conventional network, preferably, the quantity may be 6 or 5.

A normal subframe includes 14 or 12 OFDM symbols.

If an UpPTS is used as an independent subframe to transmit a PUSCH, because a quantity of OFDM symbols that correspond to a PRB in the UpPTS is less than a quantity of symbols that correspond to a PRB in a normal subframe, an encoding rate of the UpPTS is higher than an encoding rate of the normal subframe.

However, if an UpPTS and a neighboring normal subframe form an enhanced subframe to transmit a PUSCH, because a quantity of OFDM symbols that correspond to a PRB in the enhanced subframe is greater than a quantity of symbols that correspond to a PRB in a normal subframe, an encoding rate of the enhanced subframe is lower than an encoding rate of the normal subframe.

Therefore, the following embodiments of the present invention provide optimized manners, so that an encoding rate of an UpPTS is the same as or close to that of a normal subframe, and an encoding rate of an enhanced subframe is the same as or close to that of the normal subframe.

The optimized manners are described below in different cases.

Figure 6:
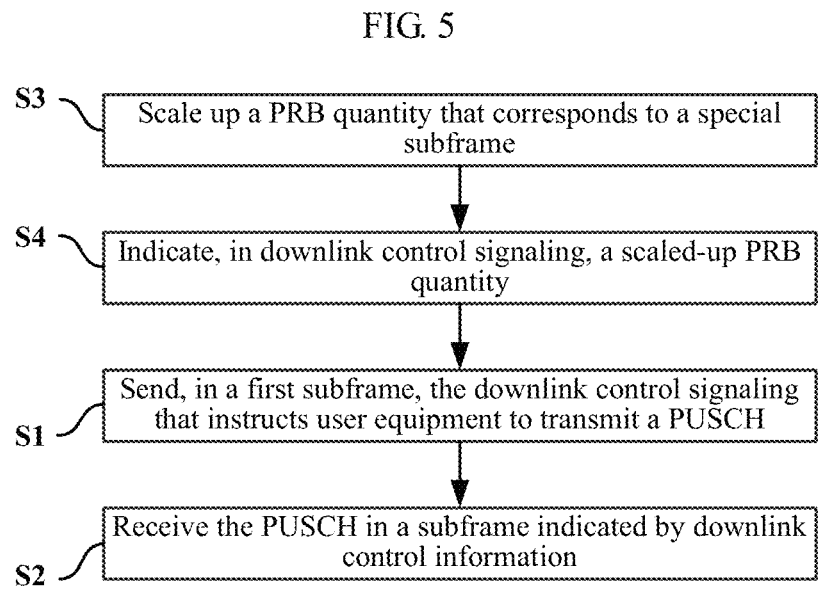
FIG. 6 is still another flowchart of a PUSCH transmission method according to an embodiment of the present invention.

For a case in which a special subframe is used as an independent subframe to transmit a PUSCH, referring to FIG. 6, the PUSCH transmission method performed by the wireless communications device 302 such as a base station may further include the following steps:

S3: Scale up a PRB quantity that is determined according to a TBS and an MCS and that corresponds to the special subframe.

That is, a normal PRB quantity that corresponds to the special subframe is first determined, and then the normal PRB quantity is scaled up, to obtain a truncated PRB quantity.

The normal PRB quantity may be referred to as PRB_1. The truncated PRB quantity after the scale-up may be referred to as PRB_2.

More specifically, PRB_1 may be increased by using a scale factor $S_f$. That is, PRB_2=$\lceil$PRB_1/$S_f$$\rceil$. [*] indicates rounding up.

S4: Indicate a scaled-up PRB quantity in the downlink control signaling.

DCI sent in a first subframe indicates a subframe in which a PUSCH is transmitted, an MCS, and a VRB (PRB), which has been mentioned above. In this example, if the PUSCH is transmitted independently in a special subframe, and the special subframe is indicated in the DCI, the PRB indicated in the DCI is the scaled-up PRB quantity, that is, PRB_2.

Step S3 and step S4 may be performed before step S1.

Certainly, when a special subframe is not indicated in the DCI, step S3 and step S4 do not need to be performed.

Figure 7:
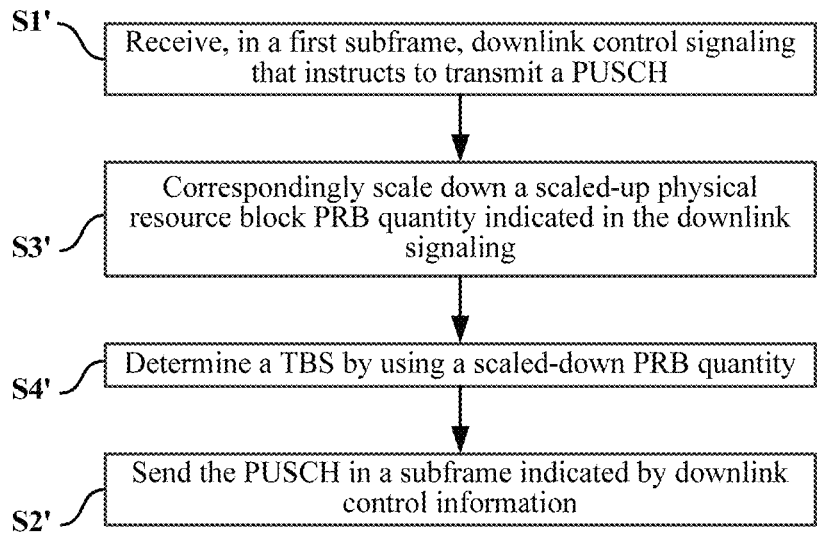
FIG. 7 is still another flowchart of a PUSCH transmission method according to an embodiment of the present invention.

Correspondingly, referring to FIG. 7, the PUSCH transmission method performed on an access device side may further include the following steps:

S3': Correspondingly scale down a scaled-up physical resource block PRB quantity indicated in the downlink signaling.

Still using the previous example, PRB_2 is indicated in DCI. An access device decreases PRB_2 to PRB_1.

More specifically, PRB_2 may be decreased by using a scale factor $S_f$. That is, PRB_1=$\lfloor$PRB_2×$S_f$$\rfloor$, or PRB_1=max {$\lfloor$PRB_2×$S_f$$\rfloor$, 1}. $\lfloor$*$\rfloor$ indicates rounding down.

More specifically, the access device may decrease PRB_2 by using the same scale factor $S_f$.

S4': Determine a TBS by using a scaled-down PRB quantity.

More specifically, an existing TBS table of LTE may be searched according to PRB_1 and an MCS that is indicated in the DCI, to determine the TBS.

It should be noted that, the PUSCH in step S2' is sent based on the determined TBS.

In addition, for a base station or the like, the base station also receives a PUSCH based on the TBS, and the TBS on which the base station is based is also determined according to PRB_1 and the indicated MCS by searching the existing TBS table of LTE.

When a special subframe is used as an independent subframe to transmit a PUSCH, a value of $S_f$ may be determined by considering the foregoing three aspects:

being consistent with a ratio of a quantity of resource elements that are included in one VRB pair in an UpPTS to a quantity of resource elements that are included in one VRB pair in a normal subframe;

RS (reference signal) overheads, where an RS includes a DMRS (demodulation reference symbol) and/or an SRS; and a resource allocation granularity of a PUSCH in a frequency domain*a scale factor being an integer, to ensure that a corrected frequency domain resource granularity is still an integer quantity of VRBs.

The following describes how to determine $S_f$ by using an example.

It is assumed that, one normal subframe includes 14 OFDM symbols. One VRB corresponds to 12 subcarriers in the frequency domain. The normal subframe includes two DMRS symbols. When system bandwidth is 20 MH, a resource scheduling granularity of a PUSCH is four VRBs.

EXAMPLE 1

It is assumed that an UpPTS has six OFDM symbols and one of the six OFDM symbols is a DMRS symbol, and then a ratio of a quantity of REs (resource element) that are included in the UpPTS to a quantity of REs that are included in a normal subframe is:

(a quantity of subcarriers that are included in one RB*a quantity of OFDM symbols that are included in an UpPTS)/ (the quantity of subcarriers that are included in the one RB*a quantity of OFDM symbols that are included in a normal subframe)=(12*5)/(12*12)=0.417; and it is considered that the granularity*the scale factor is an integer, that is, it is considered that $S_f$ multiplied by 4 is an integer, and then $S_f$ closest to 0.417 is 0.5.

EXAMPLE 2

It is assumed that an UpPTS has six OFDM symbols, one of the six OFDM symbols is a DMRS symbol, and another one of the six OFDM symbols is an SRS symbol.

Then, a ratio of a quantity of REs that are included in the UpPTS to a quantity of REs that are included in a normal subframe is: (12*4)/(12*12)=0.33; and it is considered that the granularity*the scale factor is an integer, that is, it is considered that $S_f$ multiplied by 4 is an integer, and then $S_f$ closest to 0.33 is 0.25.

EXAMPLE 3

It is assumed that an UpPTS has six OFDM symbols, one of the six OFDM symbols is a DMRS symbol, and another one of the six OFDM symbols is an SRS symbol; and it is assumed that a normal subframe includes two DMRS symbols and one SRS symbol.

Then, a ratio of a quantity of REs that are included in the UpPTS to a quantity of REs that are included in a normal subframe is: (12*4)/(12*11)=0.36; and it is considered that the granularity*the scale factor is an integer, that is, it is considered that $S_f$ multiplied by 4 is an integer, and then $S_f$ closest to 0.36 is 0.25.

EXAMPLE 4

It is assumed that an UpPTS has six OFDM symbols, one of the six OFDM symbols is a DMRS symbol, and other two of the six OFDM symbols are SRS symbols; and it is assumed that a normal subframe includes two DMRS symbols and one SRS symbol.

Then, a ratio of a quantity of REs that are included in the UpPTS to a quantity of REs that are included in a normal subframe is: (12*3)/(12*11)=0.27; and it is considered that the granularity*the scale factor is an integer, that is, it is considered that $S_f$ multiplied by 4 is an integer, and then $S_f$ closest to 0.27 is 0.25.

Figure 8:
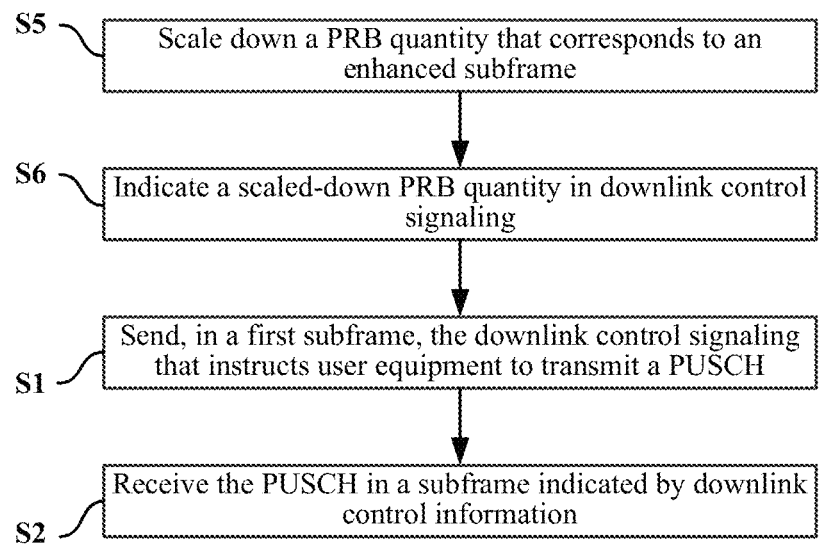
FIG. 8 is still another flowchart of a PUSCH transmission method according to an embodiment of the present invention.

For a case in which a special subframe and a neighboring subframe form an enhanced subframe, referring to FIG. 8, the PUSCH transmission method performed by the wireless communications device 302 such as a base station may further include the following steps:

S5: Scale down a PRB quantity that is determined according to a TBS and an MCS and that corresponds to the enhanced subframe.

That is, a normal PRB quantity that corresponds to a special subframe is first determined, and then the normal PRB quantity is scaled down.

The normal PRB quantity may be referred to as PRB_3. A scaled-down PRB quantity, that is, an extended PRB quantity, may be referred to as PRB_4.

More specifically, PRB_3 may be decreased by using a scale factor $S_f$.

That is, PRB_4=⌊PRB_3×$S_f$⌋, or PRB_4=max {⌊PRB_3× $S_f$⌋, 1}. ⌊*⌋ indicates rounding down.

S6: Indicate a scaled-down PRB quantity in the downlink control signaling.

In this example, if a special subframe and a neighboring subframe form an enhanced subframe, and the special subframe is indicated in the DCI, the PRB indicated in the DCI is the scaled-down PRB quantity, that is, PRB_4.

Step S5 and step S6 may be performed before step S1.

Certainly, when a special subframe is not indicated in the DCI, step S5 and step S6 do not need to be performed.

Figure 9:
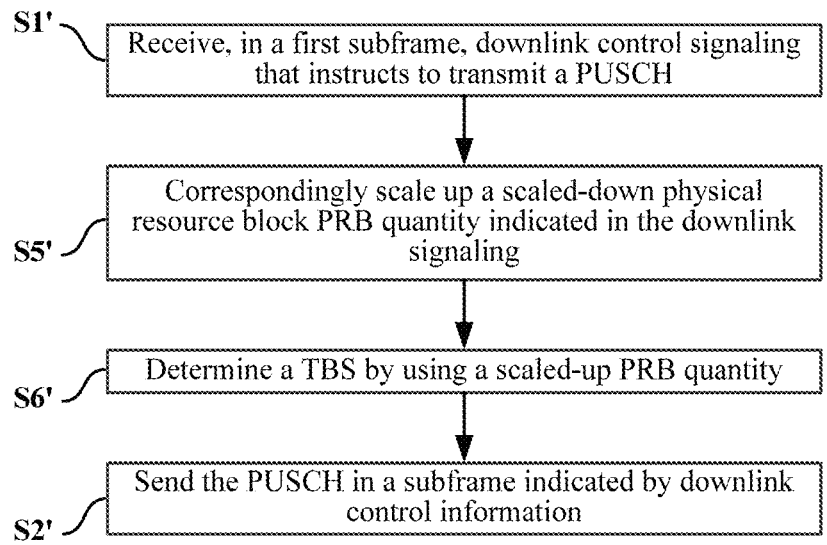
FIG. 9 is still another flowchart of a PUSCH transmission method according to an embodiment of the present invention.

Correspondingly, referring to FIG. 9, the PUSCH transmission method performed on an access device side may further include the following steps:

When the special subframe indicated by the downlink control information, and a neighboring subframe form an enhanced subframe, the method further includes:

S5': Correspondingly scale up a scaled-down PRB quantity indicated in the downlink signaling.

Still using the previous example, PRB_4 is indicated in DCI. An access device increases PRB_4 to PRB_3.

More specifically, PRB_3 may be increased by using a scale factor $S_f$. That is, PRB_3=⌈PRB_4/$S_f$⌉. ⌈*⌉ indicates rounding up.

S6': Determine a TBS by using a scaled-up PRB quantity.

More specifically, the access device (such as UE) may search an existing TBS table of LTE according to PRB_3 and an MSC that is indicated in the DCI, to determine the TBS.

It should be noted that, the PUSCH in step S2' is sent based on the determined TBS.

In addition, for a base station or the like, the base station also receives a PUSCH based on the TBS, and the TBS on which the base station is based is also determined according to PRB_3 and the indicated MCS by searching the existing TBS table of LTE.

When a special subframe and a neighboring normal subframe form an enhanced subframe to transmit a PUSCH, a value of $S_f$ may be determined by considering the foregoing three aspects:

being consistent with a ratio of a quantity of resource elements that are included in one VRB pair in the enhanced subframe to a quantity of resource elements that are included in one VRB pair in a normal subframe;

RS overheads, where an RS includes a DMRS and/or an SRS; and a resource allocation granularity of a PUSCH in a frequency domain*a scale factor being an integer, to ensure that a corrected frequency domain resource granularity is still an integer quantity of VRBs.

The following describes how to determine $S_f$ by using an example.

It is assumed that, one normal subframe includes 14 OFDM symbols. One VRB corresponds to 12 subcarriers in the frequency domain. The normal subframe includes two DMRS symbols. When system bandwidth is 20 MH, a resource scheduling granularity of a PUSCH is four VRBs.

EXAMPLE 1

It is assumed that an UpPTS has six OFDM symbols and one of the six OFDM symbols is a DMRS symbol, and then a ratio of a quantity of REs (resource element) that are included in an enhanced subframe to a quantity of REs that are included in a normal subframe is:

(12*(5+12))/(12*12)=1.417; and it is considered that the granularity*the scale factor is an integer, that is, it is considered that $S_f$ multiplied by 4 is an integer, and then $S_f$ closest to 1.417 is 1.5.

EXAMPLE 2

It is assumed that an UpPTS has six OFDM symbols, one of the six OFDM symbols is a DMRS symbol, and another one of the six OFDM symbols is an SRS symbol.

Then, a ratio of a quantity of REs that are included in an enhanced subframe to a quantity of REs that are included in a normal subframe is: (12*(4+12))/(12*12)=1.33; and it is considered that the granularity*the scale factor is an integer, that is, it is considered that $S_f$ multiplied by 4 is an integer, and then $S_f$ closest to 1.33 is 1.25.

EXAMPLE 3

It is assumed that an UpPTS has six OFDM symbols, one of the six OFDM symbols is a DMRS symbol, and another one of the six OFDM symbols is an SRS symbol; and it is assumed that a normal subframe includes two DMRS symbols and one SRS symbol.

Then, a ratio of a quantity of REs that are included in an enhanced subframe to a quantity of REs that are included in a normal subframe is: $(12*(4+11))/(12*11)=1.36$; and it is considered that the granularity*the scale factor is an integer, that is, it is considered that $S_f$ multiplied by 4 is an integer, and then $S_f$ closest to 1.26 is 1.25.

EXAMPLE 4

It is assumed that an UpPTS has six OFDM symbols, one of the six OFDM symbols is a DMRS symbol, and other two of the six OFDM symbols are SRS symbols; and it is assumed that a normal subframe includes two DMRS symbols and one SRS symbol.

Then, a ratio of a quantity of REs that are included in an enhanced subframe to a quantity of REs that are included in a normal subframe is: $(12*(3+11))/(12*11)=1.27$; and it is considered that the granularity*the scale factor is an integer, that is, it is considered that $S_f$ multiplied by 4 is an integer, and then $S_f$ closest to 1.27 is 1.25.

Figure 10:
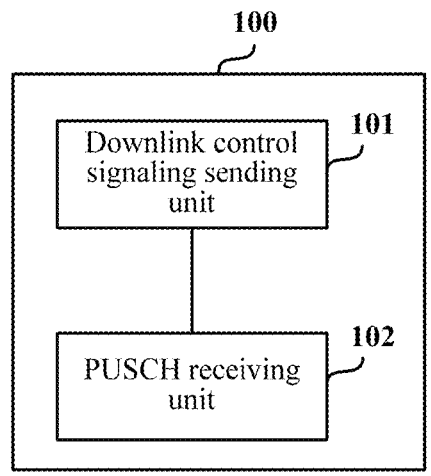
FIG. 10 is an exemplary structural diagram of a PUSCH transmission apparatus according to an embodiment of the present invention.

FIG. 10 is a structural block diagram of a PUSCH transmission apparatus 100 according to an embodiment of the present invention. The PUSCH transmission apparatus 100 may include:

a downlink control signaling sending unit 101, configured to send, in a first subframe, downlink control signaling that instructs UE to transmit a PUSCH, where the first subframe may be represented as a subframe n (n is greater than or equal to 0 and less than 10); and the downlink control signaling carries downlink control information, and the downlink control information is used to indicate a subframe for transmitting the PUSCH; and a PUSCH receiving unit 102, configured to receive the PUSCH in the subframe indicated by the downlink control information.

The apparatus 100 may be used as a base station, an AP, a Relay station, or the like.

The subframe for transmitting the PUSCH may be any one of or any combination of N subframes (N is an integer not less than 1), and the N subframes include a special subframe.

For uplink-downlink subframe configurations 1 to 5, one uplink subframe can be scheduled in one downlink subframe, and therefore, a specific value of N may be 1.

However, in another embodiment of the present invention, the specific value of N may be 3. Then, the subframe (that is, the subframe indicated by the downlink control information) in which the PUSCH is transmitted may be any one of or any combination of the special subframe, a second subframe, and a third subframe.

Alternatively, in another embodiment of the present invention, the specific value of N may be 2. Then, the subframe (that is, the subframe indicated by the downlink control information) in which the PUSCH is transmitted may be either of or any combination of the special subframe and a second subframe.

The special subframe may be represented as a subframe n+k, the second subframe may be represented as a subframe n+p, and the third subframe may be represented as a subframe n+q, where k, p, and q are natural numbers.

More specifically, in the DCI in all the foregoing embodiments, one of or a combination of the special subframe, the second subframe, and the third subframe may be indicated by using three bits. Alternatively, either of or a combination of the special subframe and the second subframe is indicated by using two bits.

Optionally, the three bits may include two bits of an uplink index, and the remaining one bit may be a newly added bit; or a bit in the downlink control signaling is reused as the remaining one bit; or a reserved bit in the downlink control signaling is used as the remaining one bit; or all of the three bits may be newly added bits.

For how to indicate, by using three bits, a subframe in which a PUSCH is transmitted, and for values of n, k, p, and q, reference may be made to the foregoing records in this specification. Details are not described herein.

Optionally, the two bits may be two bits of an uplink index or two newly added bits.

For how to indicate, by using two bits, a subframe in which a PUSCH is transmitted, and for values of n, k, p, and q, reference may be made to the foregoing records in this specification. Details are not described herein.

In all the embodiments of the present invention, an UpPTS in a special subframe may participate in PUSCH transmission in at least two manners. One manner is that a PUSCH is transmitted independently in the UpPTS. Another manner is that, a special subframe and a neighboring subframe form an enhanced subframe, for example, a subframe 1 (a special subframe) and a subframe 2 form an enhanced subframe. For related descriptions, refer to the foregoing records in this specification.

Figure 11:
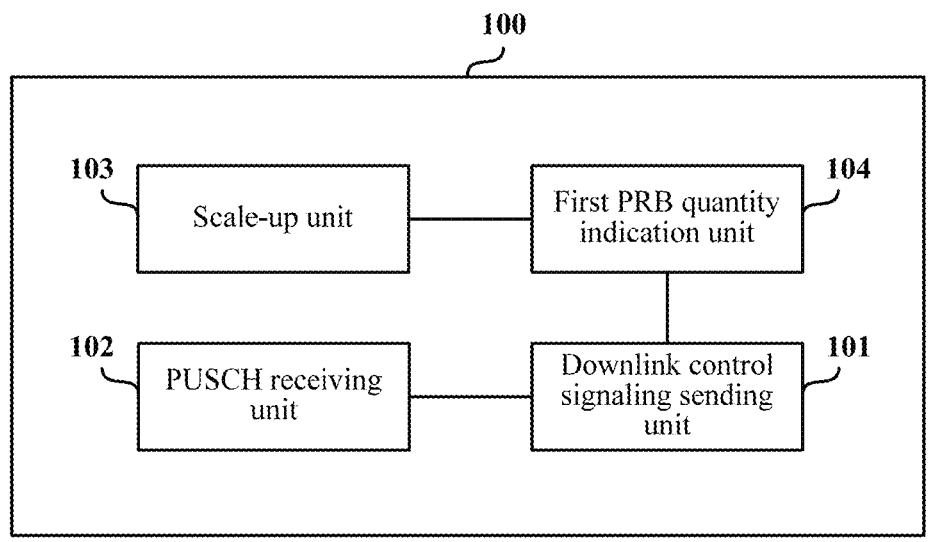
FIG. 11 is another exemplary structural diagram of a PUSCH transmission apparatus according to an embodiment of the present invention.

For a case in which a PUSCH is transmitted independently in the UpPTS, referring to FIG. 11, the apparatus 100 may further include:

a scale-up unit 103, configured to: when the subframe for transmitting the PUSCH is the special subframe, or is the special subframe and the second subframe, or is the special subframe and the third subframe, or is the special subframe, the second subframe, and the third subframe, and the PUSCH is transmitted in the special subframe that is used as an independent subframe, scale up a physical resource block PRB quantity that is determined according to a TBS and an MCS and that corresponds to the special subframe; and a first PRB quantity indication unit 104, configured to indicate a scaled-up PRB quantity in the downlink control signaling.

For specific details, reference may be made to the foregoing records in this specification. Details are not described herein.

Figure 12:
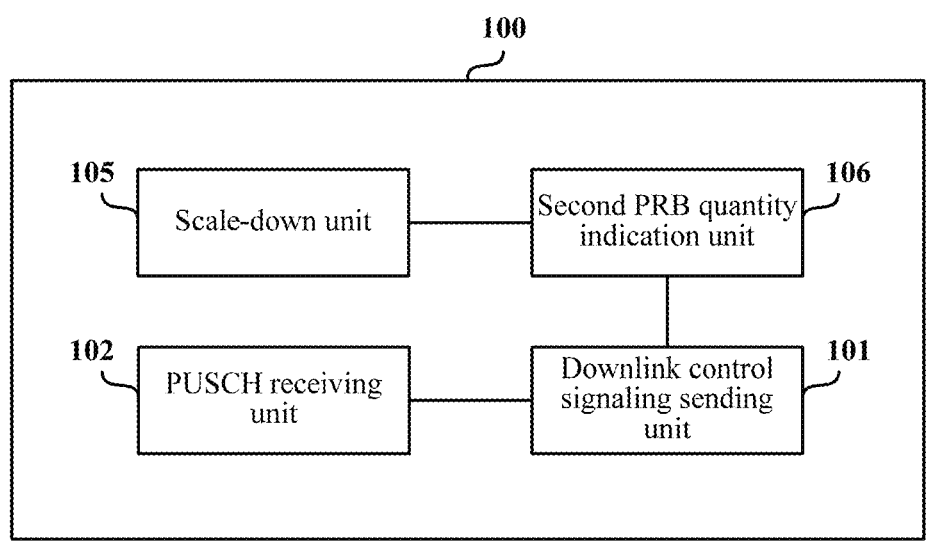
FIG. 12 is still another exemplary structural diagram of a PUSCH transmission apparatus according to an embodiment of the present invention.

For a case in which a special subframe and a neighboring subframe form an enhanced subframe, referring to FIG. 12, the apparatus 100 may further include:

a scale-down unit 105, configured to: when the special subframe indicated by the downlink control information, and a neighboring subframe form an enhanced subframe, scale down a PRB quantity that is determined according to a TBS and an MCS and that corresponds to the enhanced subframe; and a second PRB quantity indication unit 106, configured to indicate a scaled-down PRB quantity in the downlink control signaling.

For specific details, reference may be made to the foregoing records in this specification. Details are not described herein.

Figure 13:
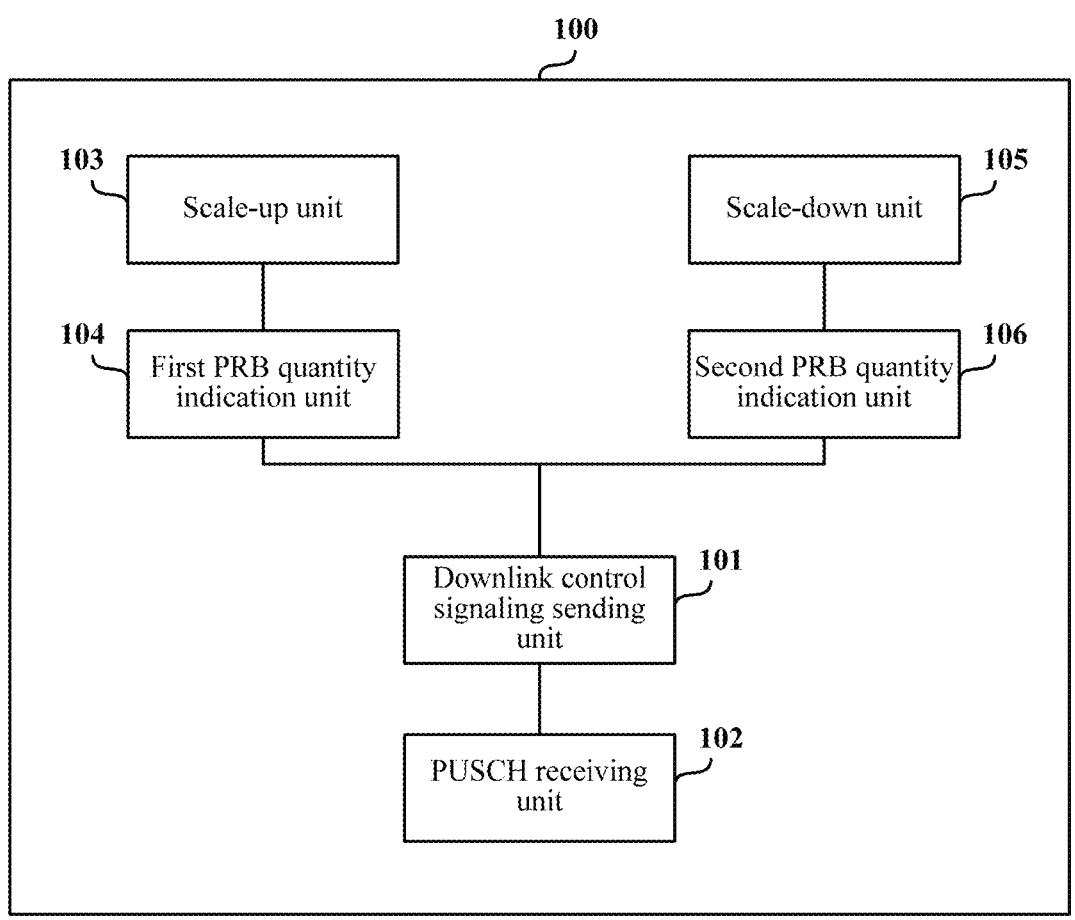
FIG. 13 is still another exemplary structural diagram of a PUSCH transmission apparatus according to an embodiment of the present invention.

In addition, referring to FIG. 13, the apparatus 100 may also include the scale-up unit 103, the first PRB quantity indication unit 104, the scale-down unit 105, and the second PRB quantity indication unit 106.

Figure 14:
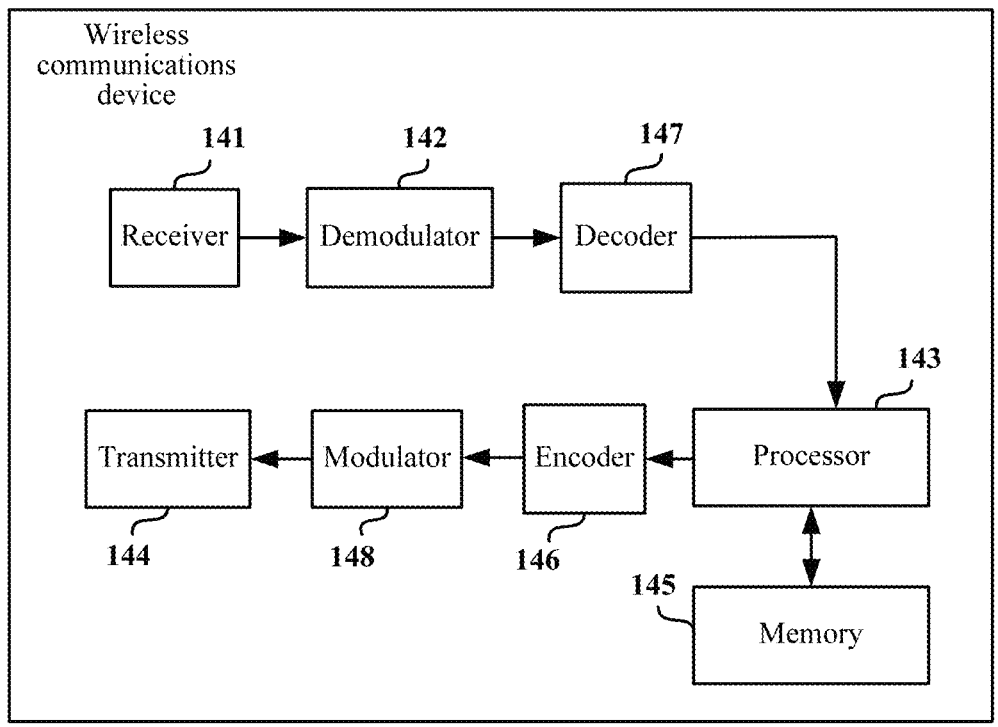
FIG. 14 is an exemplary structural diagram of a wireless communications device according to an embodiment of the present invention.

FIG. 14 is an exemplary diagram of a wireless communications device 140 (or the apparatus 100) that is in a wireless communications system and that helps to perform a PUSCH transmission method. The wireless communications device 140 may include at least a receiver 141, a processor 143, and a transmitter 144.

The receiver 141 is configured to receive a signal from, for example, a receive antenna (not shown), perform a typical action (such as filtering, amplification, down-conversion, or the like) on the received signal, and digitize the adjusted signal to obtain a sample. The receiver 141 may be, for example, an MMSE (minimum mean square error) receiver.

The transmitter 144 is configured to send a signal to an access terminal or the like. In an actual application, the receiver 141 and the transmitter 144 may also be integrated together, to form a transceiver.

The wireless communications device 140 may include a memory 145, where the memory 145 is operationally coupled to the processor 143, and stores the following data: data to be sent, received data, and any other appropriate information related to execution of various operations and functions in this specification. The memory 145 may additionally store a protocol and/or an algorithm related to polar code processing.

It may be understood that a data storage apparatus (for example, the memory 145) described in this specification may be a volatile memory or a non-volatile memory, or may include both a volatile memory and a non-volatile memory. It is exemplary rather than limitative that, the non-volatile memory may include: a ROM (read-only memory), a PROM (Programmable ROM, programmable read-only memory), an EPROM (Erasable PROM, erasable programmable read-only memory), an EEPROM (Electrically EPROM, electrically erasable programmable read-only memory), or a flash memory, and the volatile memory may include a RAM (random access memory), and is used as an external cache. RAMs in many forms such as an SRAM (Static RAM, static random access memory), a DRAM (Dynamic RAM, dynamic random access memory), an SDRAM (Synchronous DRAM, synchronous dynamic random access memory), a DDR SDRAM (Double Data Rate SDRAM, double data rate synchronous dynamic random access memory), an ESDRAM (Enhanced SDRAM, enhanced synchronous dynamic random access memory), an SLDRAM (Synchlink DRAM, synchlink dynamic random access memory), and a DR RAM (Direct Rambus RAM, direct rambus random access memory) may be used, which is an exemplary rather than limitative description. The memory 145 described in this specification intends to include, but is not limited to, these memories and any other memory of an appropriate type.

The wireless communications device 140 may further include a demodulator 142 and a decoder 147, where the demodulator 142 may be configured to demodulate received signals and provide the received signals to the decoder 147 for decoding. After decoding by the decoder 147, an original information bit such as a transport block bit may be obtained.

The wireless communications device 140 may further include an encoder 146, which can encode an original information bit such as a transport block bit, to resist influence brought by a radio channel.

The wireless communications device 140 may further include a modulator 148, which can modulate an encoded bit.

The processor 143 may be a processor that is specially configured to analyze information received by the receiver 141 or output by the decoder 147 and/or generate information to be sent by the transmitter 144 or to be processed by the encoder 146, a processor that is configured to control one or more components of the wireless communications device 140, and/or a controller that is configured to analyze a signal received by the receiver 141, generate information to be sent by the transmitter 144, and control one or more components of the wireless communications device 140.

In addition, although it is shown that the demodulator 142 and/or the decoder 147 and/or the encoder 146 and/or the modulator 148 is separated from the processor 143, it may be understood that the demodulator 142 and/or the decoder 147 and/or the encoder 146 and/or the modulator 148 may be a part of the processor 143 or multiple processors (not shown).

In addition, a layer demapping module, a resource demapping module, and the like (not shown) may be further included between the demodulator 142 and the receiver 141; a layer mapping module, a resource mapping module, and the like (not shown) may be further included between the modulator 148 and the transmitter 144; a descrambling module may be further included between the demodulator 142 and the decoder 147, and a scrambling module may be further included between the encoder 146 and the modulator 148 (both modules are not shown).

The processor 143 or multiple processors may be configured to instruct, by running a software program stored in the memory and invoking data stored in the memory, the transceiver (which may further include the receiver 141 and the transmitter 144) to perform the following steps:

sending, in a first subframe, downlink control signaling that instructs UE to transmit a PUSCH, where the downlink control signaling carries downlink control information, and the downlink control information is used to indicate a subframe for transmitting the PUSCH, where the subframe for transmitting the PUSCH may be any one of or any combination of N subframes, the N subframes include a special subframe, and N is an integer not less than 1; and receiving the PUSCH in a subframe indicated by the downlink control information.

For specific details, reference may be made to the foregoing records in this specification. Details are not described herein.

In another embodiment of the present invention, the processor in all the foregoing embodiments may be further configured to perform the following steps by running the software program stored in the memory and invoking the data stored in the memory:

when the subframe for transmitting the PUSCH is the special subframe, or is the special subframe and the second subframe, or is the special subframe and the third subframe, or is the special subframe, the second subframe, and the third subframe, and the PUSCH is transmitted in the special subframe that is used as an independent subframe, scaling up a physical resource block PRB quantity that is determined according to a TBS and an MCS and that corresponds to the special subframe; and indicating a scaled-up PRB quantity in the downlink control signaling.

In another embodiment of the present invention, the processor in all the foregoing embodiments may be further configured to perform the following steps by running the software program stored in the memory and invoking the data stored in the memory:

when the special subframe indicated by the downlink control information, and a neighboring subframe form an enhanced subframe, scaling down a PRB quantity that is determined according to a TBS and an MCS and that corresponds to the enhanced subframe; and indicating a scaled-down PRB quantity in the downlink control signaling, where the neighboring subframe is an uplink subframe neighboring to the special subframe.

For specific details, reference may be made to the foregoing records in this specification. Details are not described herein.

Figure 15:
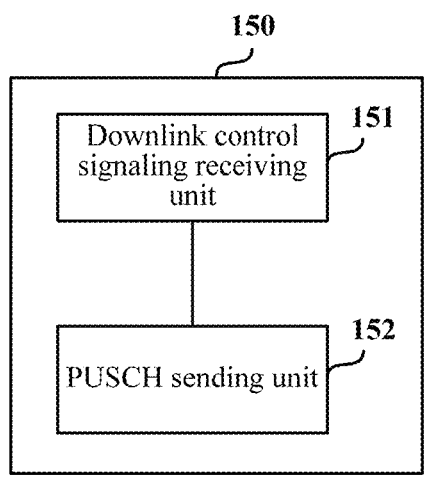
FIG. 15 is still another exemplary structural diagram of a PUSCH transmission apparatus according to an embodiment of the present invention.

FIG. 15 is a structural block diagram of a PUSCH transmission apparatus 150 according to an embodiment of the present invention. The PUSCH transmission apparatus 100 may include:

a downlink control signaling receiving unit 151, configured to receive, in a first subframe, downlink control signaling that instructs to transmit a physical uplink shared channel PUSCH, where the first subframe may be represented as a subframe n (n is greater than or equal to 0 and less than 10); and the downlink control signaling carries downlink control information, and the downlink control information is used to indicate a subframe for transmitting the PUSCH; and a PUSCH sending unit 152, configured to send the PUSCH in the subframe indicated by the downlink control information.

The apparatus 150 may be used as an access terminal, a cellular phone, a smartphone, a portable computer, a hand-held communications device, a hand-held computing device, a satellite radio apparatus, a global positioning system, a PDA, and/or any other appropriate device.

The subframe for transmitting the PUSCH may be any one of or any combination of N subframes (N is an integer not less than 1), and the N subframes include a special subframe.

In another embodiment of the present invention, a value of N may be 1, and in this case, the subframe for transmitting the PUSCH may be only a special subframe.

In another embodiment of the present invention, a specific value of N may be 3. Then, the subframe (that is, the subframe indicated by the downlink control information) in which the PUSCH is transmitted may be any one of or any combination of the special subframe, a second subframe, and a third subframe.

Alternatively, in another embodiment of the present invention, a specific value of N may be 2. Then, the subframe (that is, the subframe indicated by the downlink control information) in which the PUSCH is transmitted may be either of or any combination of the special subframe and a second subframe.

The special subframe may be represented as a subframe n+k, the second subframe may be represented as a subframe n+p, and the third subframe may be represented as a subframe n+q, where k, p, and q are natural numbers.

More specifically, in the DCI in all the foregoing embodiments, one of or a combination of the special subframe, the second subframe, and the third subframe may be indicated by using three bits. Alternatively, either of or a combination of the special subframe and the second subframe is indicated by using two bits.

Optionally, the three bits may include two bits of an uplink index, and the remaining one bit may be a newly added bit; or a bit in the downlink control signaling is reused as the remaining one bit; or a reserved bit in the downlink control signaling is used as the remaining one bit; or all of the three bits may be newly added bits.

For how to indicate, by using three bits, a subframe in which a PUSCH is transmitted, and for values of n, k, p, and q, reference may be made to the foregoing records in this specification. Details are not described herein.

Optionally, the two bits may be two bits of an uplink index or two newly added bits.

For how to indicate, by using two bits, a subframe in which a PUSCH is transmitted, and for values of n, k, p, and q, reference may be made to the foregoing records in this specification. Details are not described herein.

In all the embodiments of the present invention, an UpPTS in a special subframe may participate in PUSCH transmission in at least two manners. One manner is that a PUSCH is transmitted independently in the UpPTS. Another manner is that, a special subframe and a neighboring subframe form an enhanced subframe, for example, a subframe 1 (a special subframe) and a subframe 2 form an enhanced subframe.

It should be noted that, a special subframe and a neighboring subframe form an enhanced subframe, which is equivalent to that an UpPTS in a special subframe, and a neighboring subframe form an enhanced subframe.

Figure 16:
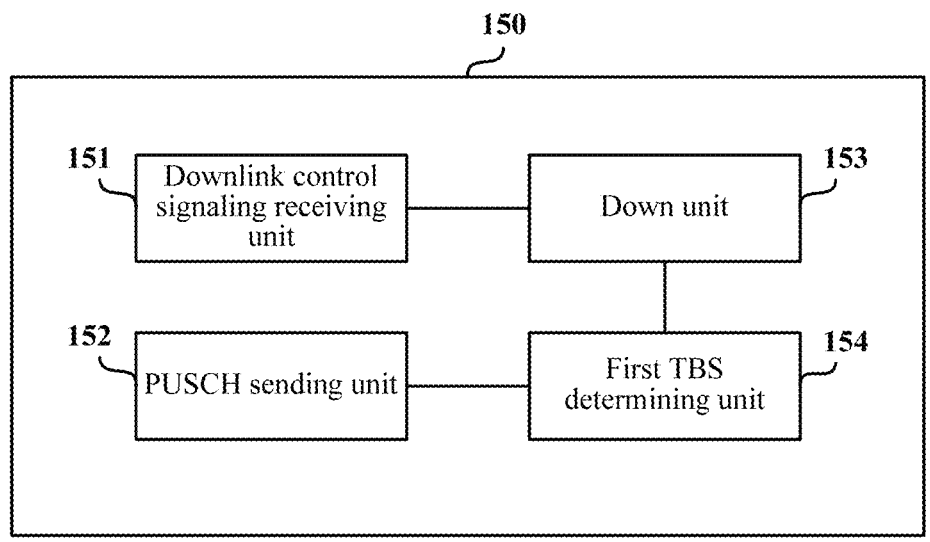
FIG. 16 is still another exemplary structural diagram of a PUSCH transmission apparatus according to an embodiment of the present invention.

For a case in which a PUSCH is transmitted independently in the UpPTS, referring to FIG. 16, the apparatus 150 may further include:

a down unit 153, configured to: when the subframe for transmitting the PUSCH is the special subframe, or is the special subframe and the second subframe, or is the special subframe and the third subframe, or is the special subframe, the second subframe, and the third subframe, and the PUSCH is transmitted in the special subframe that is used as an independent subframe, correspondingly scale down a scaled-up physical resource block PRB quantity indicated in the downlink signaling; and a first TBS determining unit 154, configured to determine a TBS by using a scaled-down PRB quantity, where the PUSCH is sent according to the determined TBS.

For specific details, reference may be made to the foregoing records in this specification. Details are not described herein.

Figure 17:
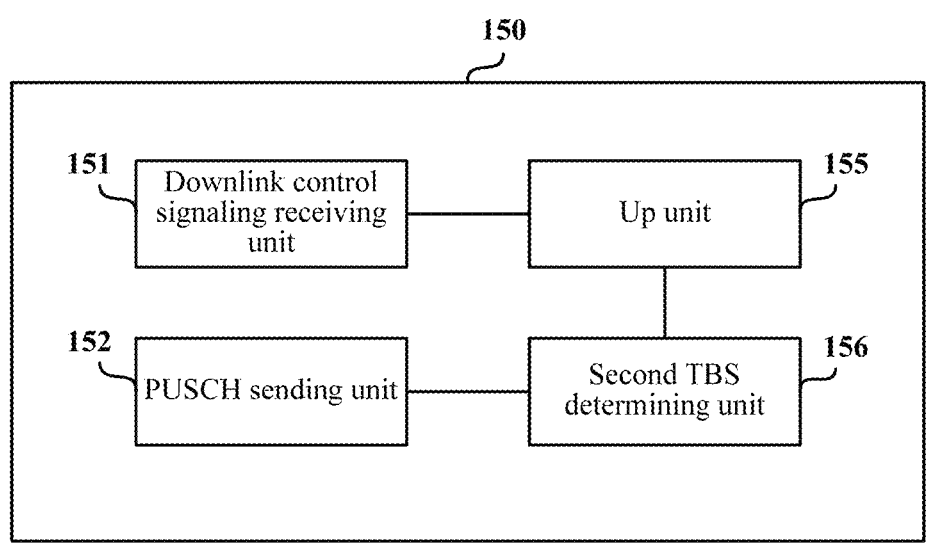
FIG. 17 is still another exemplary structural diagram of a PUSCH transmission apparatus according to an embodiment of the present invention.

For a case in which a special subframe and a neighboring subframe form an enhanced subframe, referring to FIG. 17, the apparatus 150 may further include:

an up unit 155, configured to: when the special subframe indicated by the downlink control information, and a neighboring subframe form an enhanced subframe, correspondingly scale up a scaled-down PRB quantity indicated in the downlink signaling; and a second TBS determining unit 156, configured to determine a TBS by using a scaled-up PRB quantity, where the PUSCH is sent according to the determined TBS, and the neighboring subframe is an uplink subframe neighboring to the special subframe.

For specific details, reference may be made to the foregoing records in this specification. Details are not described herein.

Figure 18:
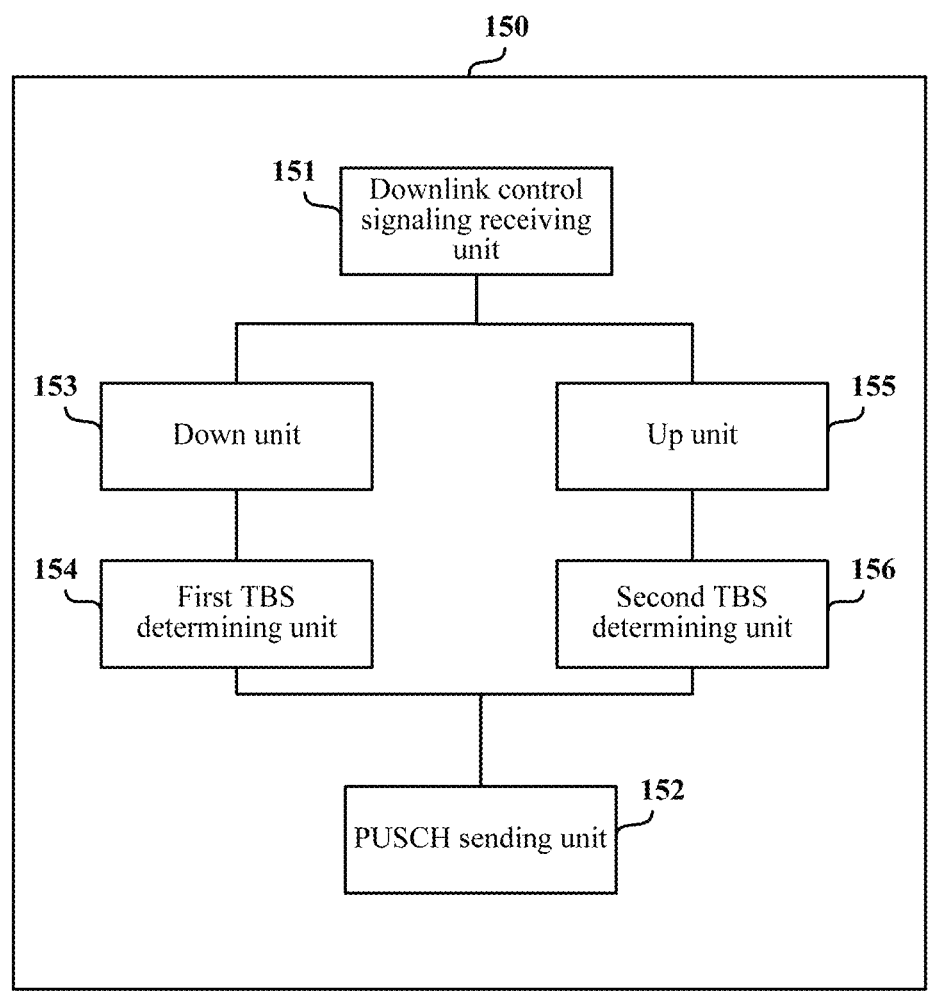
FIG. 18 is still another exemplary structural diagram of a PUSCH transmission apparatus according to an embodiment of the present invention.

In addition, referring to FIG. 18, the apparatus 150 may also include an up unit 153, a first TBS determining unit 154, a down unit 155, and a second TBS determining unit 156.

Figure 19:
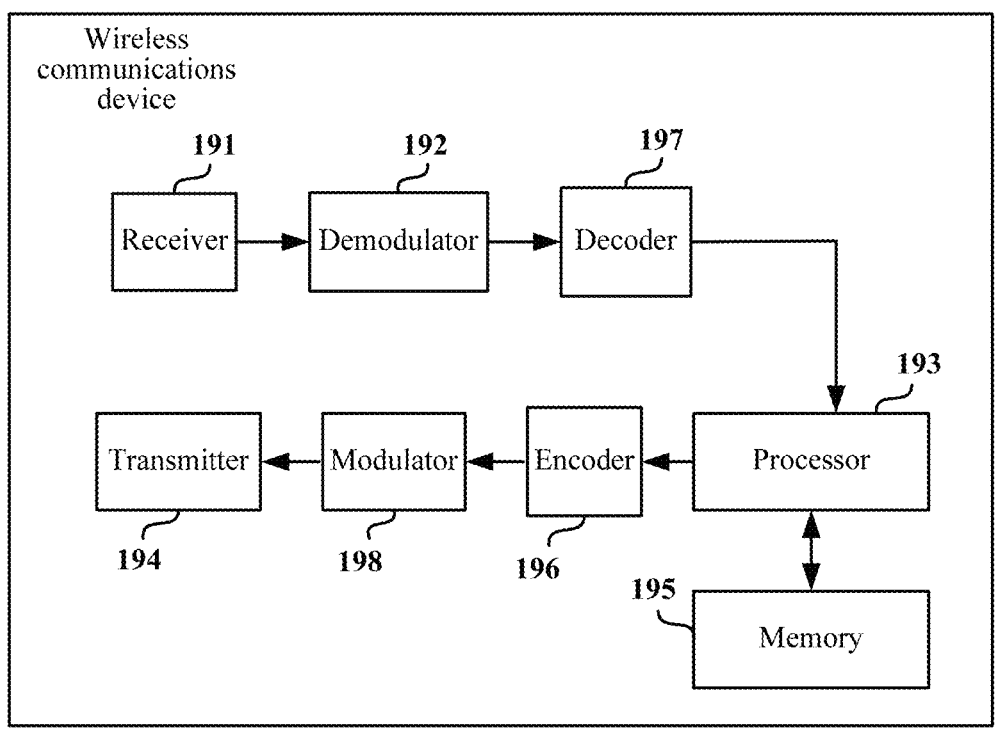
FIG. 19 is another exemplary structural diagram of a wireless communications device according to an embodiment of the present invention.

FIG. 19 is an exemplary diagram of a wireless communications device 190 (or the apparatus 150) that is in a wireless communications system and that helps to perform a PUSCH transmission method.

The wireless communications device 190 may include at least a receiver 191, a processor 193, and a transmitter 194.

The receiver 191 is configured to receive a signal from, for example, a receive antenna (not shown), perform a typical action (such as filtering, amplification, down-conversion, or the like) on the received signal, and digitize the adjusted signal to obtain a sample. The receiver 191 may be, for example, an MMSE (minimum mean square error, Minimum Mean-Squared Error) receiver.

The transmitter 194 is configured to send a signal to a base station or the like. In an actual application, the receiver 191 and the transmitter 194 may also be integrated together, to form a transceiver.

The wireless communications device 190 may include a memory 195, where the memory 195 is operationally coupled to the processor 193, and stores the following data: data to be sent, received data, and any other appropriate information related to execution of various operations and functions in this specification. The memory 195 may additionally store a protocol and/or an algorithm related to polar code processing.

It may be understood that a data storage apparatus (for example, the memory 195) described in this specification may be a volatile memory or a non-volatile memory, or may include both a volatile memory and a non-volatile memory. It is exemplary rather than limitative that, the non-volatile memory may include: a ROM (Read-Only Memory, read-only memory), a PROM (Programmable ROM, programmable read-only memory), an EPROM (Erasable PROM, erasable programmable read-only memory), an EEPROM (Electrically EPROM, electrically erasable programmable read-only memory), or a flash memory, and the volatile memory may include a RAM (Random Access Memory, random access memory), and is used as an external cache. RAMs in many forms such as an SRAM (Static RAM, static random access memory), a DRAM (Dynamic RAM, dynamic random access memory), an SDRAM (Synchronous DRAM, synchronous dynamic random access memory), a DDR SDRAM (Double Data Rate SDRAM, double data rate synchronous dynamic random access memory), an ESDRAM (Enhanced SDRAM, enhanced synchronous dynamic random access memory), an SLDRAM (Synchlink DRAM, synchlink dynamic random access memory), and a DR RAM (Direct Rambus RAM, direct rambus random access memory) may be used, which is an exemplary rather than limitative description. The memory 195 described in this specification intends to include, but is not limited to, these memories and any other memory of an appropriate type.

The wireless communications device 190 may further include a demodulator 192 and a decoder 197, where the demodulator 192 may be configured to demodulate received signals and provide the received signals to the decoder 197 for decoding. After decoding by the decoder 197, an original information bit such as a transport block bit may be obtained.

The wireless communications device 190 may further include an encoder 196, which can encode an original information bit such as a transport block bit, to resist influence brought by a radio channel.

The wireless communications device 190 may further include a modulator 198, which can modulate an encoded bit.

The processor 193 may be a processor that is specially configured to analyze information received by the receiver 191 or output by the decoder 197 and/or generate information to be sent by the transmitter 194 or to be processed by the encoder 196, a processor that is configured to control one or more components of the wireless communications device 190, and/or a controller that is configured to analyze a signal received by the receiver 191, generate information to be sent by the transmitter 194, and control one or more components of the wireless communications device 190.

In addition, although it is shown that the demodulator 192 and/or the decoder 197 and/or the encoder 196 and/or the modulator 198 is separated from the processor 193, it may be understood that the demodulator 193 and/or the decoder 197 and/or the encoder 196 and/or the modulator 198 may be a part of the processor 193 or multiple processors (not shown).

In addition, a layer demapping module, a resource demapping module, and the like (not shown) may be further included between the demodulator 192 and the receiver 191; a layer mapping module, a resource mapping module, and the like (not shown) may be further included between the modulator 198 and the transmitter 194; a descrambling module may be further included between the demodulator 192 and the decoder 197, and a scrambling module may be further included between the encoder 196 and the modulator 198 (both modules are not shown).

The processor 193 or multiple processors may be configured to instruct, by running a software program stored in the memory and invoking data stored in the memory, the transceiver (which may further include the receiver 191 and the transmitter 194) to perform the following steps:

receiving, in a first subframe, downlink control signaling that instructs to transmit a physical uplink shared channel PUSCH, where the downlink control signaling carries downlink control information, and the downlink control information is used to indicate a subframe for transmitting the PUSCH, where the subframe for transmitting the PUSCH may be any one of or any combination of N subframes (N is an integer not less than 1), and the N subframes include a special subframe, where the first subframe is represented as a subframe n (n is greater than or equal to 0 and less than 10); and sending the PUSCH in a subframe indicated by the downlink control information.

For specific details, reference may be made to the foregoing records in this specification. Details are not described herein.

In another embodiment of the present invention, the processor in all the foregoing embodiments may be further configured to perform the following steps by running the software program stored in the memory and invoking the data stored in the memory:

when the subframe for transmitting the PUSCH is the special subframe, or is the special subframe and the second subframe, or is the special subframe and the third subframe, or is the special subframe, the second subframe, and the third subframe, and the PUSCH is transmitted in the special subframe that is used as an independent subframe, correspondingly scaling down a scaled-up physical resource block PRB quantity indicated in the downlink signaling; and determining a TBS by using a scaled-down PRB quantity, where the PUSCH is sent according to the determined TBS.

In another embodiment of the present invention, the processor in all the foregoing embodiments may be further configured to perform the following steps by running the software program stored in the memory and invoking the data stored in the memory:

when the special subframe indicated by the downlink control information, and a neighboring subframe form an enhanced subframe, correspondingly scaling up a scaled-down PRB quantity indicated in the downlink signaling; and determining a TBS by using a scaled-up PRB quantity, where the PUSCH is sent according to the determined TBS, and the neighboring subframe is an uplink subframe neighboring to the special subframe.

For specific details, reference may be made to the foregoing records in this specification. Details are not described herein.

Examples of one or more embodiments are described above. Certainly, it is impossible to describe all possible combinations of components or methods to describe the embodiments, but a person of ordinary skill in the art should know that the embodiments may be further combined and modified. Therefore, the embodiments described in this application are intended to include all changes, modifications, and variations falling within the spirit and the protection scope of the appended claims. In addition, for the term "include" used in the specification or the claims, meaning included in the term is similar to that included in the term "include", and is like that of the term "include" explained as a connecting term in the claims.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A PUSCH transmission method, comprising:
   sending downlink control signaling in a first subframe by a base station, wherein the downlink control signaling instructs user equipment (UE) to transmit a physical uplink shared channel (PUSCH), wherein the downlink control signaling carries downlink control information, and the downlink control information is used to indicate a subframe for transmitting the PUSCH and a scaled-up physical resource block (PRB) quantity, wherein the subframe for transmitting the PUSCH is a special subframe;
   scaling down, by the base station, the scaled-up PRB quantity; and
   receiving according to the scaled down PRB quantity, by the base station, the PUSCH in the subframe indicated by the downlink control information,
   wherein the scaling down, by the base station, of the scaled-up PRB quantity comprises:
   scaling down the scaled-up PRB quantity PRB_2 to obtain the scaled down PRB quantity PRB_1 by using a scale factor $S_f$, wherein the PRB_1 satisfies:

$$PRB\_1 = \lfloor PRB\_2 \times S_f \rfloor \text{ or } PRB\_1 = \max\{\lfloor PRB\_2 \times S_f \rfloor, 1\},$$

wherein $\lfloor * \rfloor$ indicates rounding down.

2. The method according to claim 1, wherein the subframe for transmitting the PUSCH is one of or a combination of the special subframe, a second subframe, and a third subframe, and is indicated by using three bits.

3. The method according to claim 2, wherein the three bits comprise two bits of an uplink index.

4. The method according to claim 2, wherein the three bits are all newly added bits.

5. The method according to claim 1, wherein the subframe for transmitting the PUSCH is either of or a combination of the special subframe and a second subframe, and is indicated by using two bits.

6. The method according to claim 5, wherein the two bits are two bits of an uplink index or two newly added bits.

7. The method according to claim 1, further comprising transmitting uplink data by using the PUSCH.

8. A PUSCH transmission method, performed by user equipment (UE), comprising:
   receiving, in a first subframe by the UE, downlink control signaling of an instruction to transmit a physical uplink shared channel (PUSCH), wherein the downlink control signaling carries downlink control information, and the downlink control information is used to indicate a subframe for transmitting the PUSCH and a scaled-up physical resource block (PRB) quantity, wherein the subframe for transmitting the PUSCH is a special subframe;

scaling down, by the UE, the scaled-up PRB quantity; and sending according to the scaled down PRB quantity, by the UE, the PUSCH in the subframe indicated by the downlink control information, wherein the scaling down, by the UE, of the scaled-up PRB quantity comprises:

scaling down the scaled-up PRB quantity PRB_2 to obtain the scaled down PRB quantity PRB_1 by using a scale factor $S_f$, wherein the PRB_1 satisfies:

$$PRB\_1 = \lfloor PRB\_2 \times S_f \rfloor \text{ or } PRB\_1 = \max\{\lfloor PRB\_2 \times S_f \rfloor, 1\},$$

wherein $\lfloor * \rfloor$ indicates rounding down.

9. The method according to claim 8, wherein the subframe for transmitting the PUSCH is one of or a combination of the special subframe, a second subframe, and a third subframe, and is indicated by using three bits.

10. The method according to claim 8, wherein the subframe for transmitting the PUSCH is either of or a combination of the special subframe and a second subframe, and is indicated by using two bits.

11. A PUSCH transmission apparatus, comprising at least a processor, a transceiver, and a memory, wherein the processor is configured to instruct, by running a software program stored in the memory and invoking data stored in the memory, the transceiver to perform the following steps:

sending downlink control signaling in a first subframe, wherein the downlink control signaling instructs user equipment (UE) to transmit a physical uplink shared channel (PUSCH), wherein the downlink control signaling carries downlink control information, and the downlink control information is used to indicate a subframe for transmitting the PUSCH and a scaled-up physical resource block (PRB) quantity, wherein the subframe for transmitting the PUSCH is a special subframe;

scaling down, by the base station, the scaled-up PRB quantity; and receiving, according to the scaled down PRB quantity, the PUSCH in the subframe indicated by the downlink control information, wherein the scaling down of the scaled-up PRB quantity comprises:

scaling down the scaled-up PRB quantity PRB_2 to obtain the scaled down PRB quantity PRB_1 by using a scale factor $S_f$, wherein the PRB_1 satisfies:

$$PRB\_1 = \lfloor PRB\_2 \times S_f \rfloor \text{ or } PRB\_1 = \max\{\lfloor PRB\_2 \times S_f \rfloor, 1\},$$

wherein $\lfloor * \rfloor$ indicates rounding down.

12. A PUSCH transmission apparatus, comprising at least a processor, a transceiver, and a memory, wherein the processor is configured to instruct, by running a software program stored in the memory and invoking data stored in the memory, the transceiver to perform the following steps:

receiving, in a first subframe, downlink control signaling of an instruction to transmit a physical uplink shared channel (PUSCH), wherein the downlink control signaling carries downlink control information, and the downlink control information is used to indicate a subframe for transmitting the PUSCH and a scaled-up physical resource block (PRB) quantity, wherein the subframe for transmitting the PUSCH is a special subframe;

scaling down the scaled-up PRB quantity; and sending, according to the scaled down PRB quantity, the PUSCH in the subframe indicated by the downlink control information, wherein the scaling down of the scaled-up PRB quantity comprises:

scaling down the scaled-up PRB quantity PRB_2 to obtain the scaled down PRB quantity PRB_1 by using a scale factor $S_f$, wherein the PRB_1 satisfies:

$$PRB\_1 = \lfloor PRB\_2 \times S_f \rfloor \text{ or } PRB\_1 = \max\{\lfloor PRB\_2 \times S_f \rfloor, 1\},$$

wherein $\lfloor * \rfloor$ indicates rounding down.

\* \* \* \* \*